(12) United States Patent
Glasgow et al.

(10) Patent No.: US 10,907,119 B2
(45) Date of Patent: *Feb. 2, 2021

(54) FERMENTATION COOLING SYSTEM

(71) Applicant: WHIRLPOOL CORPORATION, Benton Harbor, MI (US)

(72) Inventors: Justin Glasgow, Carrollton, TX (US); Ryan S. Murrin, Saint Joseph, MI (US); Michael J. Scherzer, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/007,278

(22) Filed: Jun. 13, 2018

(65) Prior Publication Data

US 2018/0291319 A1 Oct. 11, 2018

Related U.S. Application Data

(63) Continuation of application No. 15/166,651, filed on May 27, 2016, now Pat. No. 10,017,722.

(Continued)

(51) Int. Cl.
  *C12C 11/00* (2006.01)
  *C12C 13/10* (2006.01)
  *F16K 5/06* (2006.01)
(52) U.S. Cl.
  CPC .......... *C12C 11/006* (2013.01); *C12C 11/003* (2013.01); *C12C 13/10* (2013.01); *F16K 5/06* (2013.01)

(58) Field of Classification Search
  CPC ....... C12C 13/10; C12C 11/00; C12C 11/003; C12C 11/006; F16K 5/06
  (Continued)

(56) References Cited

U.S. PATENT DOCUMENTS 492,292 A 2/1893 Hummel
694,584 A 3/1902 Selg
(Continued)

FOREIGN PATENT DOCUMENTS

DE 29618312 U1 11/1996
EP 0089225 * 9/1983 ............. C12C 13/10
(Continued)

OTHER PUBLICATIONS

Harris, J.O., "Single Tank Operation for Fermentation and Maturation," J. Inst. Brew., Sep.-Oct. 1980, vol. 86, pp. 230-233 (Revised Feb. 13, 1980).

(Continued)

*Primary Examiner* — Reginald Alexander
(74) *Attorney, Agent, or Firm* — Price Heneveld LLP

(57) ABSTRACT

A fermentation system includes a vessel defining a chamber for holding liquids and including a lower aperture, an insulating jacket disposed around the vessel, and a cooling fluid disposed between the insulating jacket and the vessel, the cooling fluid being in fluid communication with a fluid pump. A beverage line operably couples the lower aperture with a dispensing spigot, the beverage line being wrapped around the vessel and at least partially submerged in the fluid. The system further includes a collar disposed proximate the conical bottom portion of the vessel, the collar including a gasket in abutting contact with the insulating jacket.

20 Claims, 31 Drawing Sheets

Related U.S. Application Data

(60) Provisional application No. 62/331,840, filed on May 4, 2016.

(58) Field of Classification Search
USPC .......... 99/276, 277, 278; 165/85, 94, 96; 222/146.1, 146.2, 146.6; 220/592.21, 220/592.16, 592.18, 592.03, 592.01; 251/315.01; 137/329.03
See application file for complete search history.

(56) References Cited

U.S. PATENT DOCUMENTS

| | | | |
|---|---|---|---|
| 708,984 A | 9/1902 | Bartliff | |
| 712,431 A | 10/1902 | Bartliff | |
| 733,284 A | 7/1903 | Selg | |
| 1,033,136 A | 7/1912 | Wennersten | |
| 1,937,226 A | 11/1933 | Horch | |
| 1,988,954 A | 1/1935 | Nathan et al. | |
| 2,239,509 A * | 4/1941 | Uecker | F16L 41/086 285/55 |
| 2,277,526 A | 3/1942 | Mojonnier et al. | |
| 2,339,229 A | 1/1944 | Wyllie, Jr. | |
| 3,433,148 A | 3/1969 | Takayanagi | |
| 3,525,625 A | 8/1970 | Groulx et al. | |
| 3,730,500 A | 5/1973 | Richards | |
| 3,910,172 A | 10/1975 | Jaegle | |
| 3,926,342 A | 12/1975 | Selvia et al. | |
| 4,266,404 A | 5/1981 | Eidifrawi | |
| 4,473,171 A * | 9/1984 | Nunlist | B01J 3/002 220/565 |
| 4,494,451 A | 1/1985 | Hickey | |
| 4,708,938 A | 11/1987 | Hickinbotham | |
| 4,744,408 A | 5/1988 | Pearson et al. | |
| 4,754,698 A | 7/1988 | Naish | |
| 5,101,637 A | 4/1992 | Daily | |
| 5,311,811 A | 5/1994 | Kuzyk | |
| 5,364,639 A | 11/1994 | MacLennan et al. | |
| 5,365,830 A | 11/1994 | MacLennan et al. | |
| 5,718,161 A | 2/1998 | Beadle | |
| 5,743,108 A | 4/1998 | Cleland | |
| 6,032,571 A | 3/2000 | Brous et al. | |
| 6,629,490 B1 | 10/2003 | Lu et al. | |
| 7,963,213 B1 | 6/2011 | Murdock | |
| 8,601,936 B2 | 12/2013 | Williams et al. | |
| 2004/0012914 A1 | 1/2004 | Chu et al. | |
| 2006/0138177 A1 | 6/2006 | Wauters et al. | |
| 2013/0082202 A1 * | 4/2013 | Morrison | E21B 33/14 251/315.01 |
| 2013/0340624 A1 | 12/2013 | Webber | |
| 2014/0017354 A1 | 1/2014 | Joseph et al. | |
| 2015/0000530 A1 | 1/2015 | Mitchell et al. | |
| 2015/0000531 A1 | 1/2015 | Mitchell et al. | |
| 2015/0000532 A1 | 1/2015 | Mitchell et al. | |
| 2015/0351290 A1 | 12/2015 | Shedd | |
| 2016/0194586 A1 * | 7/2016 | Nordkvist | G01N 21/3577 426/16 |

FOREIGN PATENT DOCUMENTS

| | | |
|---|---|---|
| GB | 2123850 A | 2/1984 |
| GB | 2157314 A | 10/1985 |
| JP | 2001120253 A | 5/2001 |
| JP | 2004344055 A | 12/2004 |
| WO | 9832836 A2 | 7/1998 |

OTHER PUBLICATIONS

Speidel, "Translation from the German original Operating/brewing instructions," Speidels Braumeister, Item No. 41010, 47070, 45050, Issue, Nov. 2014 (32 pages).

* cited by examiner

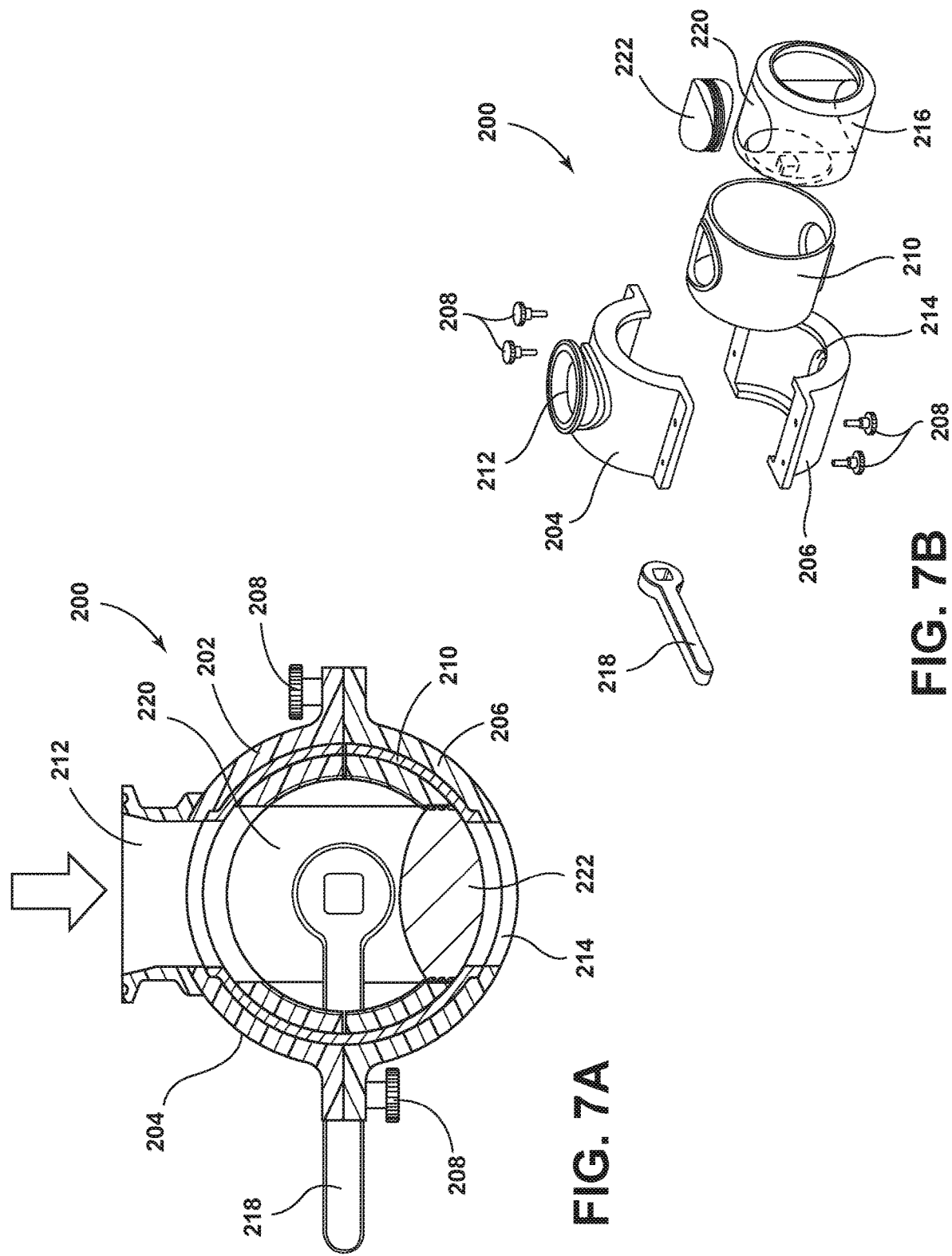

FERMENTATION COOLING SYSTEM

CROSS-REFERENCE TO RELATED APPLICATIONS

This application is a continuation of U.S. patent application Ser. No. 15/166,651, filed on May 27, 2016, entitled "FERMENTATION COOLING SYSTEM," now U.S. Pat. No. 10,017,722, which issued on Jul. 10, 2018, which claims priority to and the benefit under 35 U.S.C. § 119(e) of U.S. Provisional Patent Application No. 62/331,840, filed on May 4, 2016, entitled "FERMENTATION COOLING SYSTEM," the entire disclosures of which are hereby incorporated herein by reference.

BACKGROUND OF THE DISCLOSURE

The present disclosure generally relates to a fermentation cooling system, and more particularly to a fermentation cooling system configured for use in making beverages.

SUMMARY OF THE DISCLOSURE

According to one aspect of the disclosure, a fermentation system includes a vessel defining a chamber for holding liquids and including a lower aperture, an insulating jacket disposed around the vessel, and a cooling fluid disposed between the insulating jacket and the vessel, the cooling fluid being in fluid communication with a fluid pump. A beverage line operably couples the lower aperture with a dispensing spigot, the beverage line being wrapped around the vessel and at least partially submerged in the fluid. The system further includes a collar disposed proximate the conical bottom portion of the vessel, the collar including a gasket in abutting contact with the insulating jacket.

According to another aspect of the disclosure, a fermentation system includes a vessel defining a chamber for holding liquids and including a lower aperture, an insulating jacket disposed around the vessel, and a fluid disposed between the insulating jacket and the vessel. The system further includes a beverage line operably coupling the lower aperture with a dispensing spigot. The beverage line is wrapped around the vessel and is at least partially submerged in the fluid. The dispensing spigot is operably coupled with one of a tap and a hot wort injection unit. The hot wort injection unit is configured to circulate wort through the beverage line, cooling the wort and injecting the wort into the chamber.

According to still another aspect of the disclosure, a fermentation system includes a vessel defining a chamber for holding liquids and a sediment removal assembly disposed on a bottom of the vessel and which includes a rotatable sediment reservoir having a stopper sealingly engaged with a wall of the sediment reservoir and slideable within the reservoir to expel excess sediment collected within the vessel when the reservoir is rotated.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 7A is a front elevational partial cross-sectional view of a sediment removal assembly of the present disclosure;

FIG. 7B is a top perspective exploded view of the sediment removal assembly of FIG. 7;

DETAILED DESCRIPTION OF EMBODIMENTS

Figure 1A:
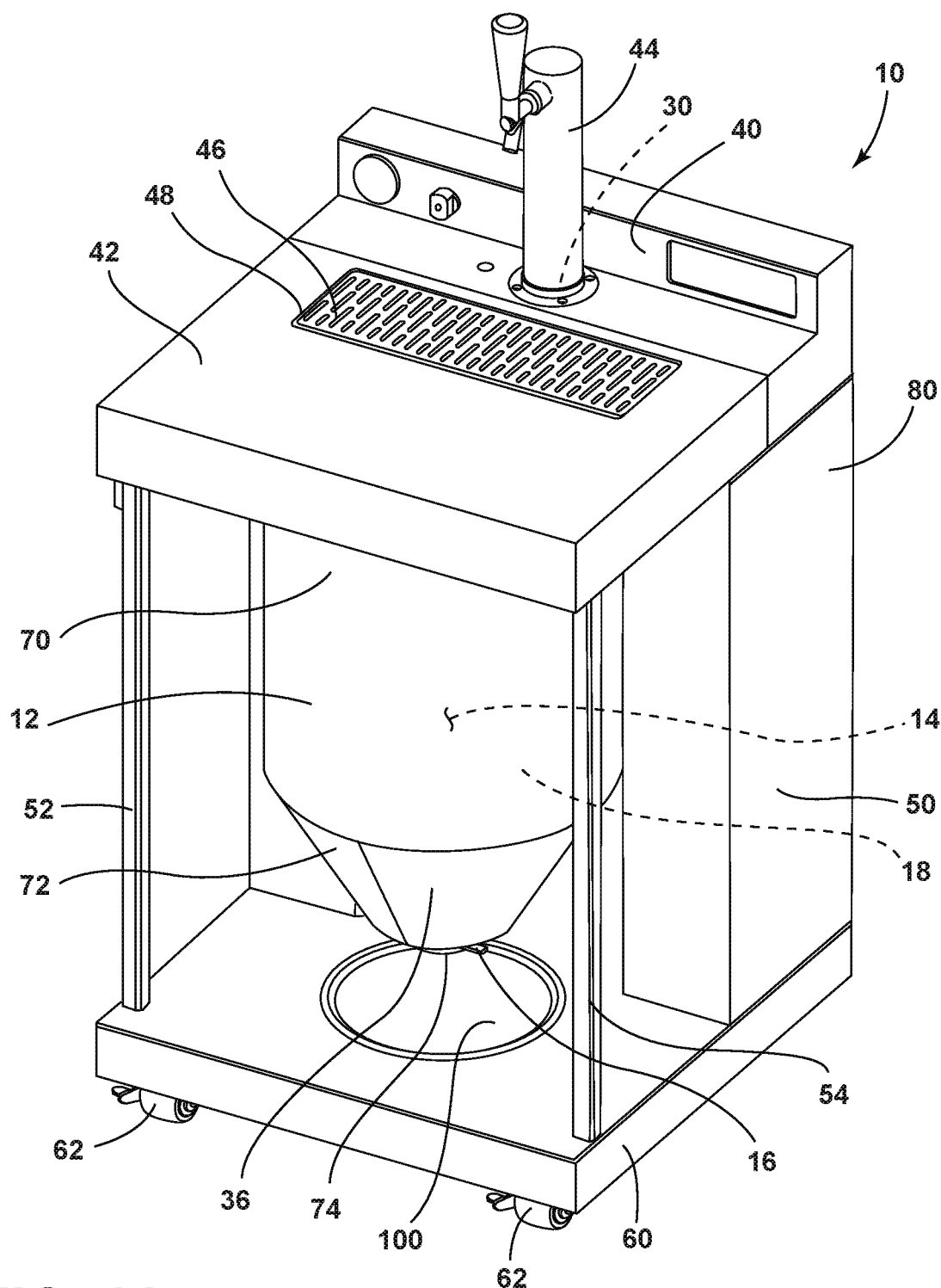
FIG. 1A is a front perspective view of one embodiment of a fermentation cooling system of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-29, reference numeral 10 generally designates a fermentation system having a vessel 12 defining a chamber 14 for holding liquids and including a lower aperture 16. An insulating jacket 18 is disposed around the vessel 12. A cooling fluid 20 is disposed between the insulating jacket 18 and the vessel 12. The cooling fluid 20 is in fluid communication with a fluid pump 22. A refrigerant line 24 is wrapped around the vessel 12 and is configured to cool the vessel 12, using the cooling fluid 20. This results in cooling of liquids 26 disposed in the chamber 14. A beverage line 28 operably couples the lower aperture 16 with a dispensing spigot 30. The beverage line 28 is wrapped around the vessel 12 and is at least partially submerged in the cooling fluid 20. A sediment drain line 32 is disposed below the lower aperture 16 and configured to drain sediment that accumulates on a bottom 36 of the vessel 12.

Figure 1B:
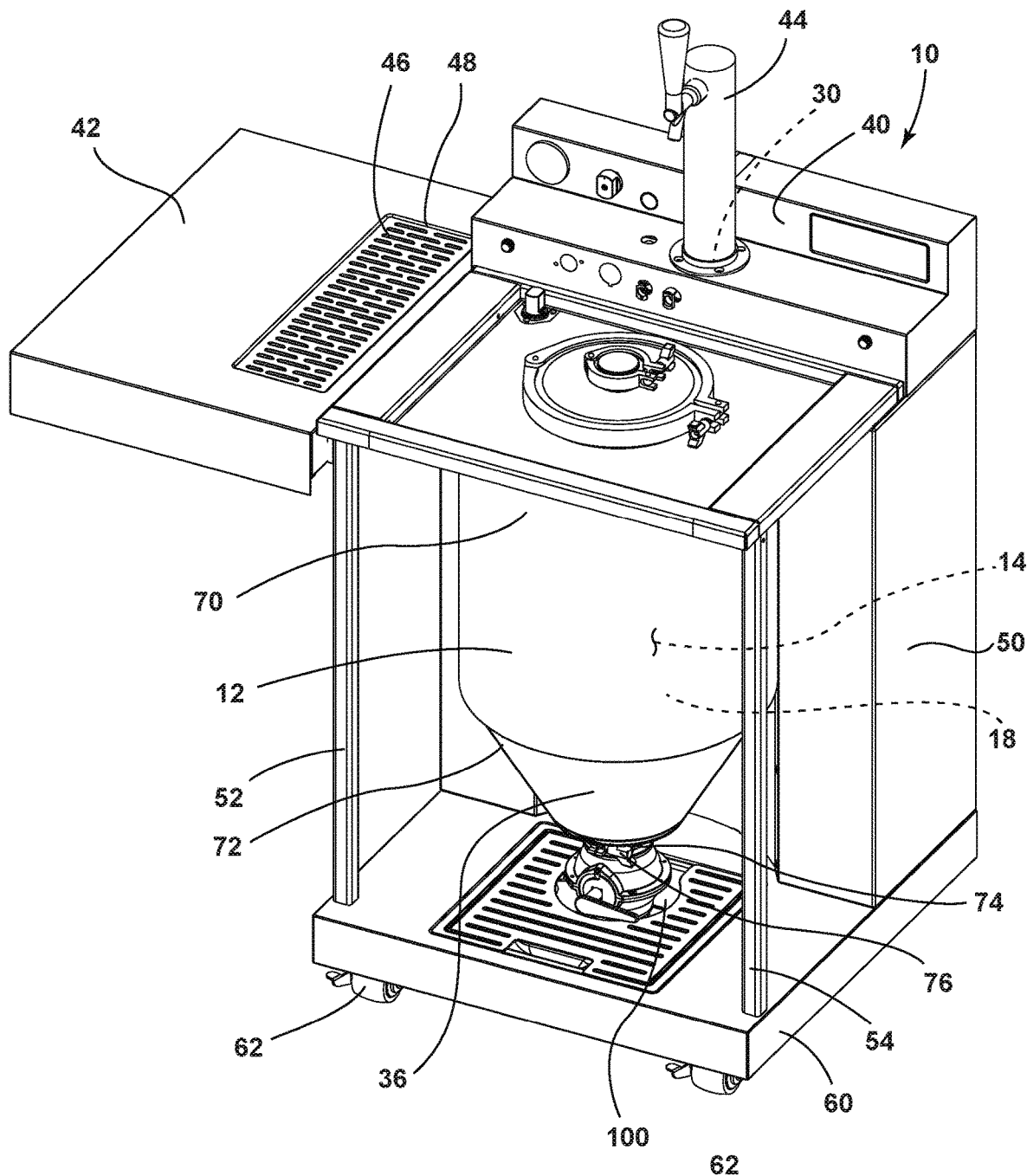
FIG. 1B is the fermentation cooling system of FIG. 1A with a work surface positioned on a side of the unit.
Figure 2:
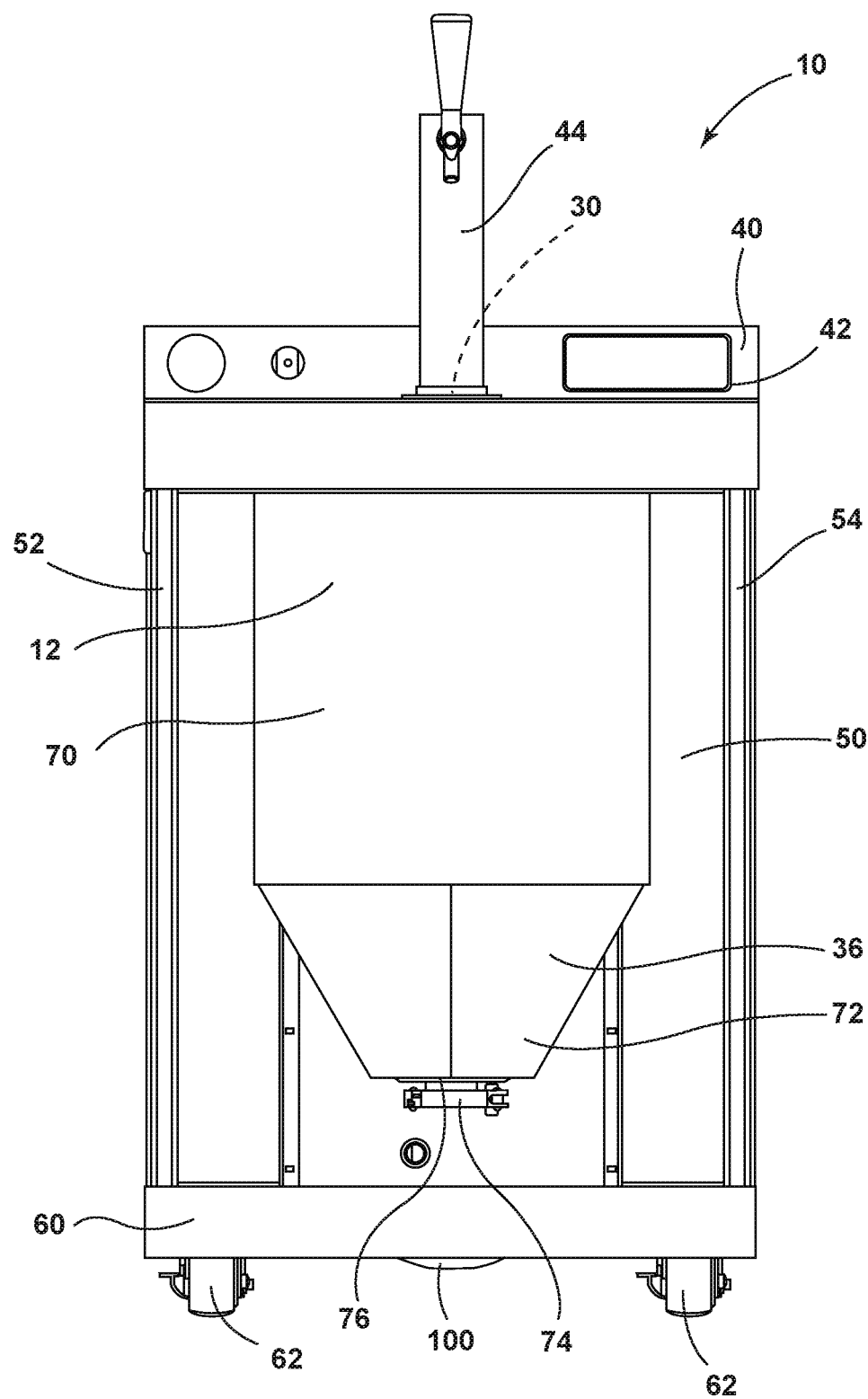
FIG. 2 is a front elevation view of the fermentation cooling system of FIG. 1.
Figure 3:
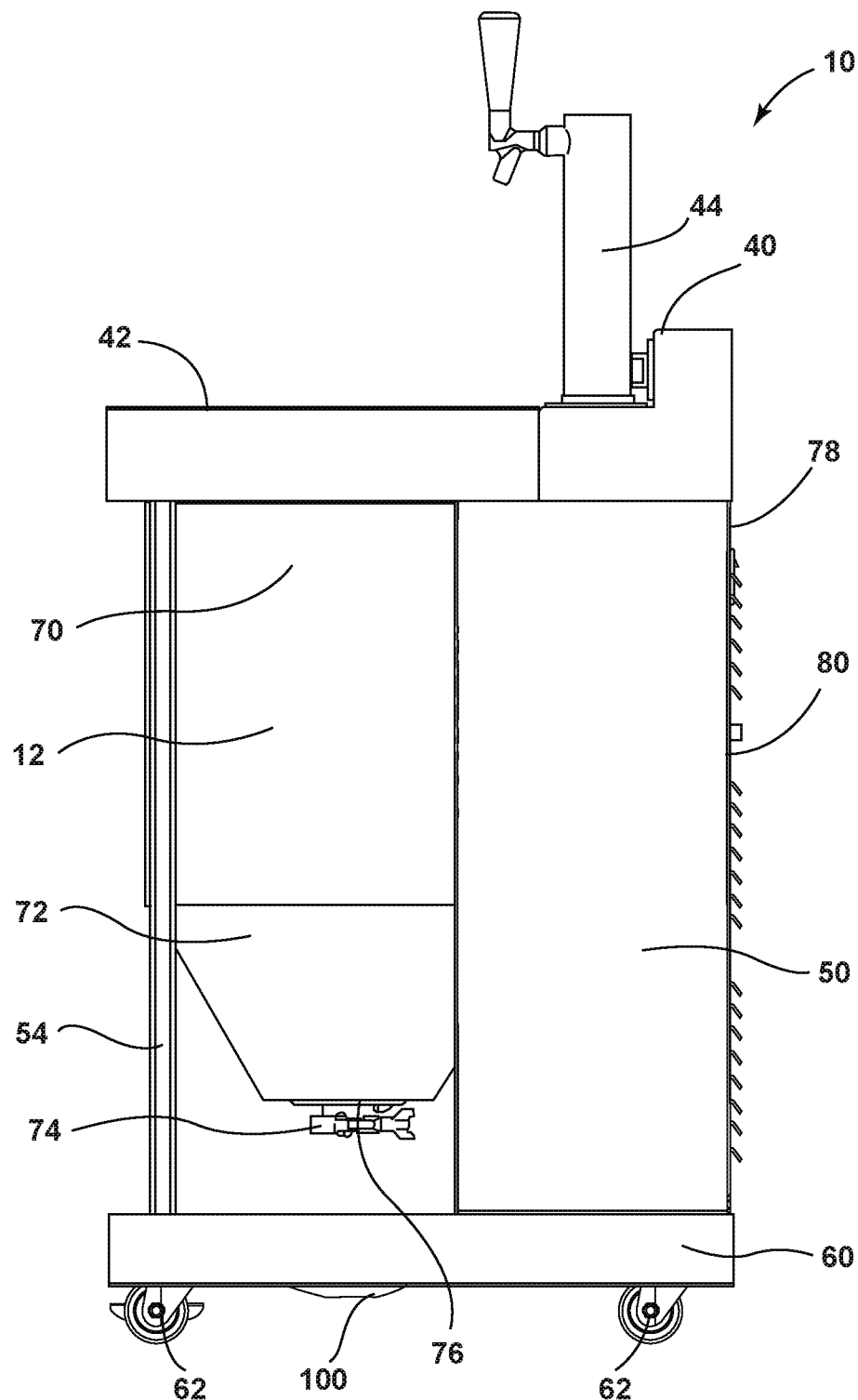
FIG. 3 is a side elevation view of the fermentation cooling system of FIG. 1.

With reference again to FIG. 1, the illustrated fermentation system 10 includes an upper control panel 40 designed to allow a user to control specific aspects of the fermentation process. The upper control panel 40 may include temperature controls, timers, flow regulators, etc. The fermentation system 10 also includes a work surface 42 having a tap 44 operably coupled with the dispensing spigot 30 and a beverage drain 46 disposed below the tap 44. The beverage drain 46 is operably coupled with a storage container 48 for receiving spilled beverage liquids, or may be operably coupled with a drain line that empties to an exterior drain. The work surface 42 of the fermentation system 10 is supported by a cabinet 50, as well as first and second forward support posts 52, 54. The first and second forward support posts 52, 54 rest on a base 60 of the fermentation system 10. The base 60 is generally supported by casters 62 that allow for mobility of the fermentation system 10. The work surface 42 is removably attached to the fermentation system 10. Accordingly, the work surface 42 can also be removed and attached to a side of the cabinet 50 to create a side work surface 42 or prepping surface, as shown in FIG. 1B. The work surface 42 may be coupled via mechanical fasteners, snap-fit connectors, magnets, etc.

With reference to FIGS. 1A-3, the illustrated vessel 12 of the fermentation system 10 includes a generally cylindrical upper portion 70 and a bottom 36 of the vessel 12 generally includes a conical lower portion 72. The conical lower portion 72 includes a sediment removal device 74 disposed at a bottom end 76 thereof. The sediment removal device 74 may include a variety of different assemblies configured to remove sediment that collects within the conical lower portion 72 of the vessel 12. A rear side 78 of the cabinet 50 includes a ventilated rear wall 80 that maximizes heat dissipation from inside the cabinet 50. Heat dissipation is important as heat can be generated by components disposed inside the cabinet 50. The cabinet 50 is generally configured to support or store various components of the fermentation system 10 including a CO2 tank as well as a compressor and an evaporator for a refrigeration system, as well as a fluid pump, used in conjunction with the cooling fluid 20 (FIG. 4), which may be glycol. The cabinet 50 can also be used to store various components or ingredients used in the fermentation process.

Figure 4:
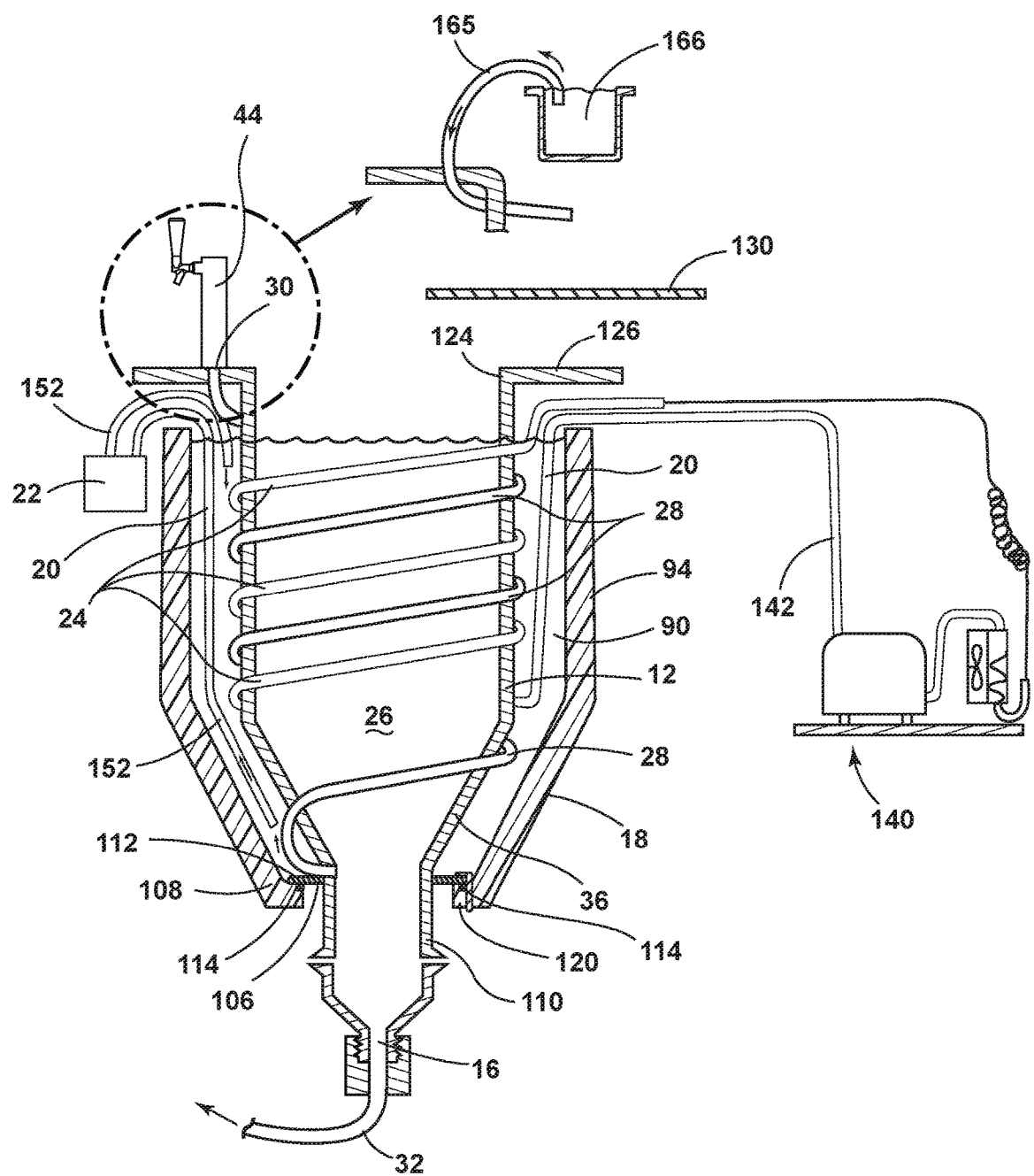
FIG. 4 is a schematic cross sectional view of a fermentation cooling system of the present disclosure.

With reference to FIG. 4, the vessel 12 is spaced a predetermined distance from the insulating jacket 18 to define an insulating cavity 90. The insulating jacket 18 may include a configuration that allows for nesting of the vessel 12 within the insulating jacket 18. Stated differently, the insulating jacket 18 may include a complementary configuration that allows for the vessel 12 to nest easily within the insulating jacket 18 and still provide space between the vessel 12 and the insulating jacket 18 for the insulating cavity 90. It is generally contemplated that the insulating jacket 18 may have a cover 94 to protect the insulating jacket 18. The cover 94 may include a steel cladding, stainless steel cladding, plastic, etc. The sediment removal device 74 is disposed below the conical lower portion 72 of the vessel 12 and may include the sediment drain line 32, as shown in FIG. 4. Other sediment removal devices are also contemplated and disclosed herein.

With reference to the illustrated embodiments of FIGS. 1A-4, a well 100 is disposed below the bottom end 76 of the vessel 12 and is configured to receive and retain sediment and fluids that accumulate during the fermentation process. The well 100 may also receive and retain a purge tank that receives and holds sediment (see FIGS. 30-34). Sidewalls of the insulating jacket 18 and the vessel 12, respectively, are sealed such that liquids will not pass through the sidewalls of the insulating jacket 18 or the vessel 12. In addition, an opening 106 is defined in a lower portion 108 of the insulating jacket 18. The opening 106 is configured to allow a neck 110 of the vessel 12 to pass therethrough. The neck 110 includes a steel or stainless steel collar 112 that is welded to the neck 110 and generally extends in a direction orthogonal to the neck 110. An O-ring 114 seals the neck 110 to the lower portion 108 of the insulating jacket 18. More specifically, the lower portion 108 of the insulating jacket 18 includes an inwardly extending transverse wall 120. The collar 112 that extends about the neck 110 of the vessel 12 abuts the transverse wall 120 and is sealed against the transverse wall 120 by the O-ring 114 or gasket. Accordingly, the cooling fluid 20 that is disposed between the vessel 12 and the insulating jacket 18 is maintained in the space between the vessel 12 and the insulating jacket 18, and does not leak below the fermentation system 10. A top portion 124 of the vessel 12 includes a transverse upper wall 126. The transverse upper wall 126 is configured to receive a lid 130 or other containing member that keeps the beverages in the vessel 12. It is generally contemplated that the cooling fluid 20, which may be any of a number of cooling fluids, including glycol, will be filled to a height that is at the height of the beverage inside the vessel 12 or slightly higher. In one embodiment, the vessel 12 retains 5 gallons of beverages and has an approximately 8 gallon capacity.

With reference again to FIG. 4, the fermentation system 10 generally includes a refrigerating unit 140 in fluid communication with the refrigerant line 24. The refrigerant line 24 is wrapped around the vessel 12 at least one time to aid in cooling the vessel 12 and the cooling fluid 20. After a refrigerant 142 in the refrigerant line 24 has circulated through the fermentation system 10 and has cooled both the vessel 12 and the cooling fluid 20, the warmed refrigerant 142 is pumped back to the refrigerating unit 140 where the warmed refrigerant 142 is again run through a refrigeration cycle in the refrigerating unit 140. When the refrigerant 142 is cooled again, the cooled refrigerant 142 is then delivered back into the insulating cavity 90 defined between the vessel 12 and the insulating jacket 18 and into the cooling fluid 20 where the refrigerant 142, through the refrigerant line 24, cools the vessel 12 and the cooling fluid 20. The cycle repeats until a predetermined and ideal temperature has been reached. The desired temperature is typically between 50° F. and 80° F. Either the refrigerating unit or the heater may be used to obtain the desirable temperature. The beverage line 28 also wraps around the vessel 12 in the space defined between the vessel 12 and the cooling fluid 20. Beverage liquid that is inside the vessel 12 can be drawn from the conical lower portion 72 of the vessel 12. After being drawn from the conical lower portion 72, the beverage travels along the beverage line 28 around the vessel 12, which maintains a cool temperature of the vessel 12. Finally, the beverages dispensed from the dispensing spigot 30 are operably coupled with a beverage tap. A user can then retrieve the beverage from the beverage tap for consumption. The fermentation system 10, as set forth herein, does not include any internal components. Rather, the external dispensing spigot 30 allows the beverage liquid to flow through the beverage line 28 to the dispensing spigot 30.

The fermentation system 10 may also include the cooling fluid pump 22 having cooling lines 152 configured to move the cooling fluid 20 within the space defined between the vessel 12 and the insulating jacket 18. Movement of the fluid helps to evenly cool the vessel 12 and can also be used to draw cooler cooling fluid from a bottom portion of the vessel 12 and deposit the cooler cooling fluid to an upper region outside of the vessel 12 where the cooling fluid 20 is not as cool. As a result, a consistent and even temperature can be maintained in the space between the vessel 12 in the insulating jacket 18, which consequently results in an even temperature of the beverage fluid disposed inside the vessel 12.

Figure 5:
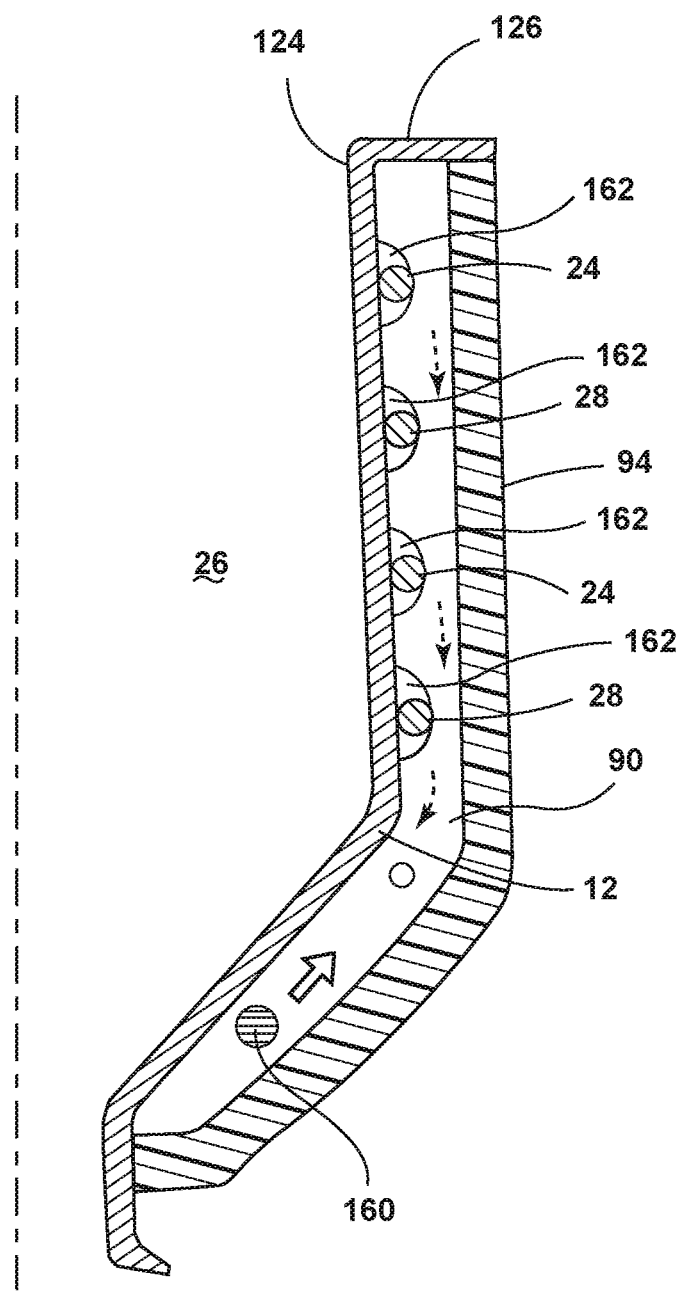
FIG. 5 is an enlarged schematic cross-sectional view of a vessel side wall of a fermentation cooling system of the present disclosure.
Figure 6:
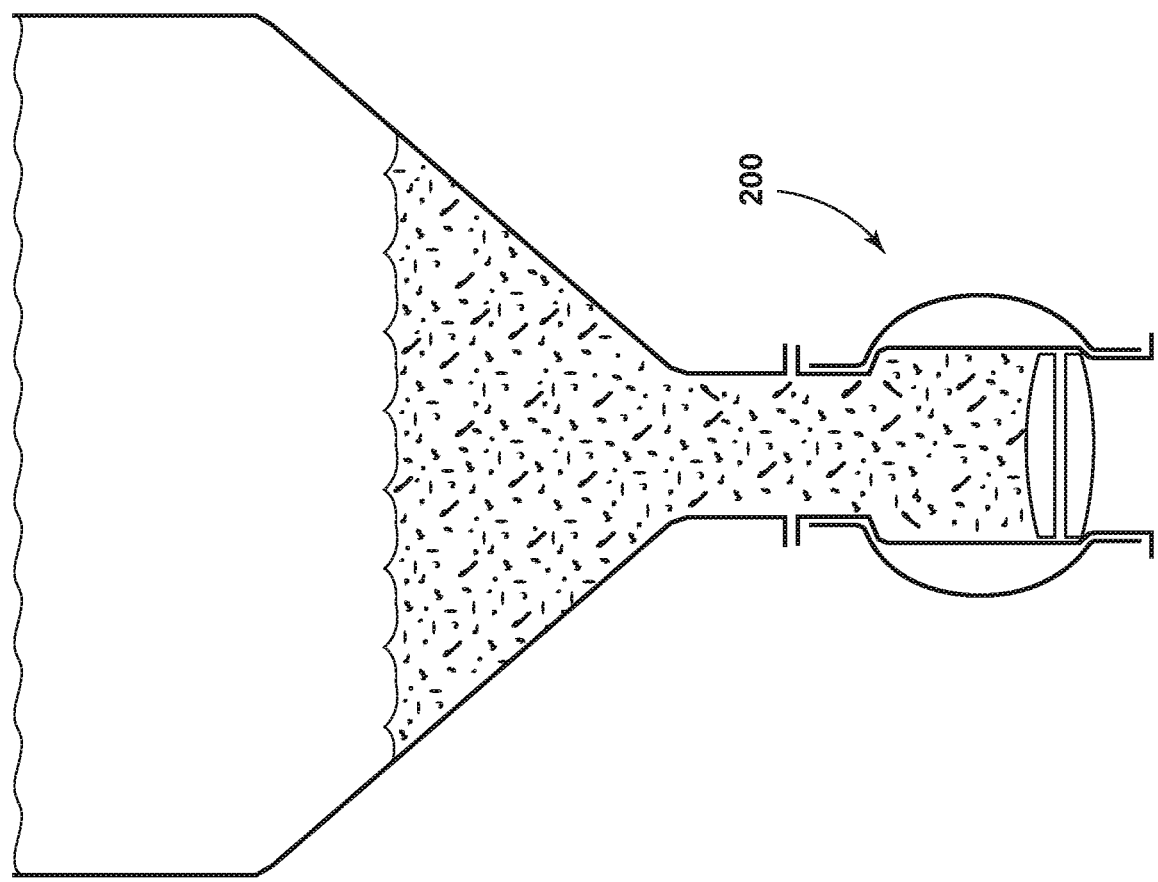
FIG. 6 is a schematic view of one embodiment of a sediment removal assembly of the present disclosure.

With reference to the embodiment generally illustrated in FIG. 5, a portion of the fermentation system 10 is illustrated. In this construction, the insulating cavity 90 is filled with air. The air in the insulating cavity 90 allows for convection between the vessel 12 and the insulating jacket 18. In addition, a heater 160 is positioned on the conical lower portion 72 of the vessel 12. The heater 160 is generally in abutment with the conical lower portion 72 of the vessel 12, and provides heat to the wall of the vessel 12. In addition, heat from the heater 160 moves upwardly within the insulating cavity 90, resulting in warming of the entire vessel 12. In an instance where the vessel 12 needs to be cooled, the refrigerant lines 24 are activated and cool the cylindrical upper portion 70 of the vessel 12. In this instance cool air from the refrigerant lines 24 moves downward and also cools the conical lower portion 72. It is generally contemplated in this instance that a thermal mastic putty 162 may be applied to the refrigerant lines 24 to help maintain the spacing of the refrigerant lines 24 relative to one another along the external wall of the vessel 12. The mastic putty 162 also helps keep the refrigerant lines 24 in contact with the external wall of the vessel 12.

Traditional cooling jackets are frequently double wall stainless steel, with glycol fluid flowing between the walls. This construction is costly and difficult to manufacture. Often, only a double wall is disposed in the cone (lower) section of the vessel, which is again due to cost and manufacturing ease. Vessel cooling is generally achieved through external temp control, like placing the vessels in a cool location (basement), or inside a refrigerator. Basement temps cannot easily be controlled, and air cooling in a refrigerator requires extra refrigerator controls to allow temperatures above 55° F. as most refrigerators are not designed to reach temperatures above 55° F. Wort chilling is done by inserting cooling coils into the hot wort, or circulating the wort through coils immersed in an ice water bath. These require more equipment and the added need for either a cool water source and/or ice, which also increases the chances for bacteria contamination. Some competitive systems pump the chilled (or heated) glycol from an external tank to the double wall stainless steel vessel, which takes up space and can add to the cost/complexity due to the mandatory glycol pump for circulation. This same competitive system only has a double wall in the cone section of the vessel, which represents only a small portion of the total contact surface with the fermenting beer and wort. The reduced contact area does not allow for adequate temperature control (and homogenous temperature in the entire vessel), and with the cooler liquid being more dense than the warmer liquid, having the cooling in the cone (which is the bottom section of the vessel) is not ideal to cool the larger volume of liquid that sits above the cone.

The current disclosure includes an expanded polystyrene (EPS) or Styrofoam jacket that doubles as an outer wall and containment for the glycol cooling solution, along with providing its typical insulation properties, which eliminates the need for a double wall stainless steel vessel, which can be costly. The EPS can also easily be extended all the way up the side of the vessel, which greatly increases the surface area for contact by the chilled (or heated) glycol. The EPS can be replaced with similar insulative materials including polyurethane foam. In either instance, the insulative jacket may be approximately 1 to 2 inches thick, although other thicknesses are also contemplated.

With reference to the disclosure set forth herein, wrapping the cooling system (evaporator component of the sealed refrigeration system) around the stainless steel vessel, and immersing in the glycol solution, is effective, efficient, and equalizes the temperature throughout the entire volume of glycol. The total contact of the glycol with the cooling line gives maximum heat transfer between the glycol and the cooling system due to the "100%" surface contact. A heater can also be immersed into the glycol solution, which can work to heat up the glycol when needed. Wrapping the beverage line (beer/draft serving line) in the same manner as, and adjacent to, the cooling line, properly chills the line up to the point of the tap, which greatly reduces foam production caused by a warm beer line that goes through the pressure drop of the beer tap. The beverage line doubles as a wort chilling line 165. It is critical to rapidly cool wort 166 after boiling to reduce the chance of bacteria growth. Wort chilling is typically achieved through the use of a chilling coil inserted into the wort (with cooling water running through the coil), which takes time and equipment, and also increases the chances of contamination due to the insertion of the cooling equipment. This feature is not necessary with the current disclosure. The wort may be siphoned or pumped into the beverage line.

The EPS jacket functions as both the primary insulator, as well as the outer containment for the glycol solution, which removes the need for a double wall stainless steel vessel for cooling and allows the use of a single wall vessel. The void (for glycol flow) created between the EPS and the outer wall of the stainless steel vessel can be extended up the cylinder portion of the vessel, which greatly increases the surface area for contact by the chilled (or heated) glycol solution, and which also greatly increases temperature control and ensures a more homogenous temperature throughout the internal volume. Selecting the correct density (and bead size) and thickness for the EPS will be critical to eliminate glycol permeation. Other materials (like polyurethane) can be used. Alternatively, the inside of the EPS can be sealed with a polyurea, or other coating. The wort chilling line uses the glycol chilling system to cool, versus cool water (or ice bath), as the wort enters the vessel, the wort continues to be cooled as it collects on the inside of the vessel. A glycol pump (optional) can be used to circulate the glycol within the cavity, which could be used to increase cooling efficiency, especially during wort chill.

With reference now to the illustrated embodiment in FIGS. 7A and 7B, one embodiment of a sediment removal assembly 200 is illustrated. The sediment removal assembly 200 includes a housing 202 having an upper portion 204 and a lower portion 206. The upper portion 204 and the lower portion 206 are connected via mechanical fasteners 208. A sleeve 210 is disposed inside the housing 202 and is aligned with upper and lower apertures 212, 214 of the housing 202. The sleeve 210 includes an inner cylindrical sealing member 216 that can be rotated via a handle 218 relative to the sleeve 210. The cylindrical sealing member 216 defines an elongate cylindrical space defining a sediment reservoir 220 therein with a stopper 222 that is movable within the sediment reservoir 220. Initially, the stopper 222 is located in the lower portion 206 of the housing 202. Over time, sediment collects above the stopper 222. When the sediment reservoir 220 becomes full, the handle 218 can be rotated, which results in rotation of the stopper 222 until the stopper 222 reaches the upper portion 204 of the housing 202. When the stopper 222 reaches the upper portion 204 of the housing 202, pressure from inside the vessel 12 forces the stopper 222 downward, which results in sediment within the sediment reservoir 220 being ejected from within the sediment reservoir 220 out the bottom of the housing 202. This step can be repeated multiple times to remove sediment simply by rotating the handle 218 180 degrees. As illustrated in FIGS. 7 and 8, it is generally contemplated that the cylindrical sealing member 216 may be rotated in either direction to aid in forcing the stopper 222 downward, thus ejecting the collected sediment. This configuration prevents continuous flow from inside the vessel 12 to the outside environment. This concept also allows very little waste of the desired contents from the vessel 12. In addition, this configuration displaces air, preventing oxygen from being introduced into the tank. The stopper 222 acts to wipe the inturned wall of the sediment reservoir clean during activation.

With reference now to the illustrated embodiment in FIGS. 8A-8G, an embodiment of a sediment removal assembly 224 is illustrated. The sediment removal assembly 224 includes a housing 225 having an upper portion 226A and a lower portion 226B. The upper portion 226A and the lower portion 226B are connected via mechanical fasteners, adhesive, etc. and include a gasket 226C disposed therebetween. A receptacle 227 is defined by the housing 225 and is aligned with upper and lower apertures 228A, 228B of the housing 225. The receptacle 227 includes an inner cylindrical sealing member 229 with an upper sealing ring 234A and a lower sealing ring 234B. The cylindrical sealing member 229 can be rotated via a handle 230 relative to the receptacle 227. The cylindrical sealing member 229 defines an elongate cylindrical space defining a sediment reservoir 231 therein with a stopper 232 that is movable within the sediment reservoir 231. Upper and lower sealing bands 233A, 233B are disposed inside the receptacle 227 and help guide the inner cylindrical sealing member 229 as well as the upper sealing ring 234A and lower sealing ring 234B during rotation. Each of the upper and lower sealing bands 233A, 233B includes a gasket 235 that seals the upper and lower sealing bands 233A, 233B against the housing 225. A gasket 238 is disposed proximate each of the upper sealing ring 234A and the lower sealing ring 234B. In addition, the stopper 232 includes first and second gaskets 236A, 236B that seal the stopper against an inner wall of the cylindrical sealing member 229. The upper portion 226A may include a collar 239 that configured to mechanically engage the bottom of the vessel 12.

Figure 8A:
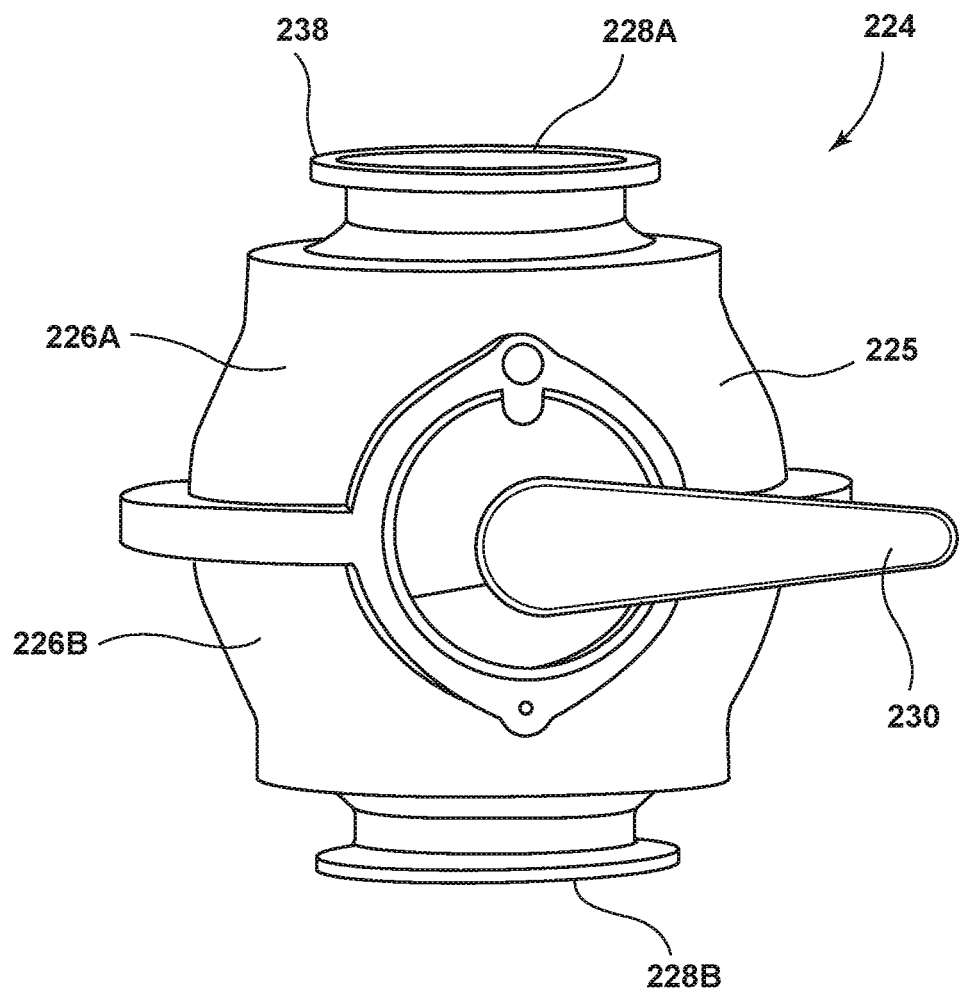
FIG. 8A is a front perspective view of another sediment removal assembly according to the present disclosure.
Figure 8B:
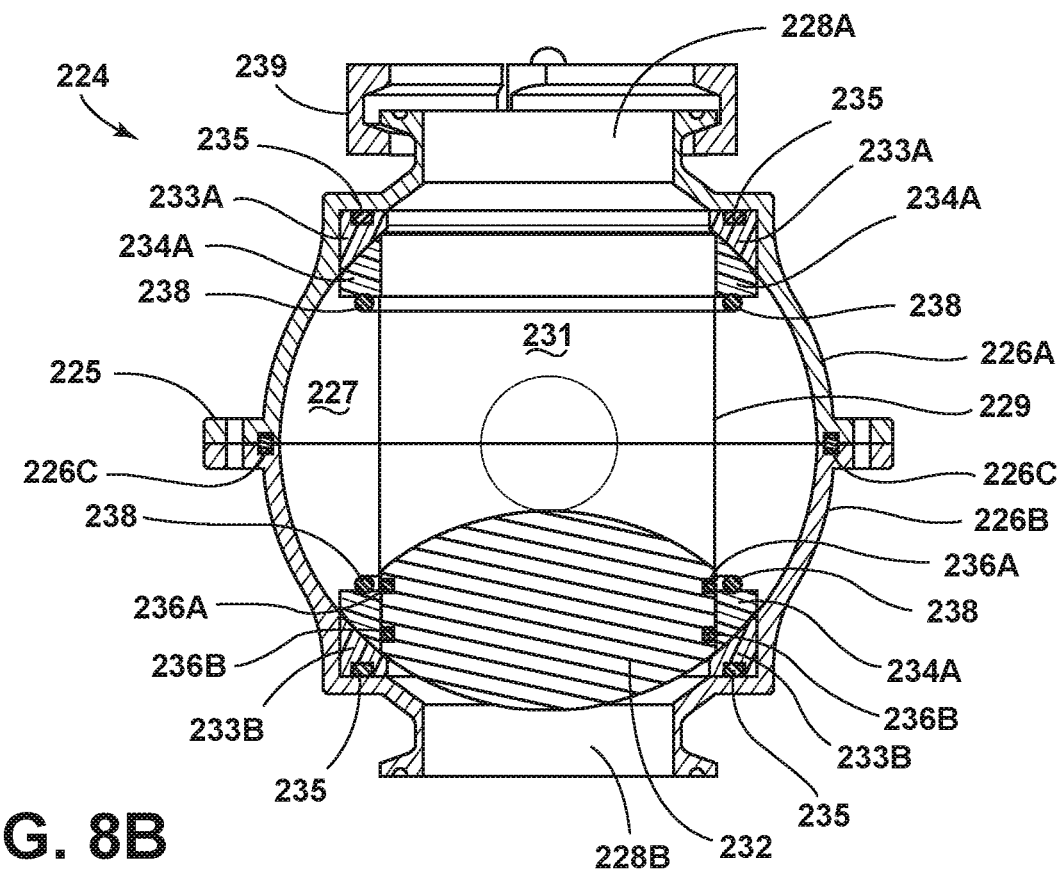
FIG. 8B is an elevational cross-sectional view of the sediment removal assembly of FIG. 8A with the sediment removal assembly in a first operating position.
Figure 8C:
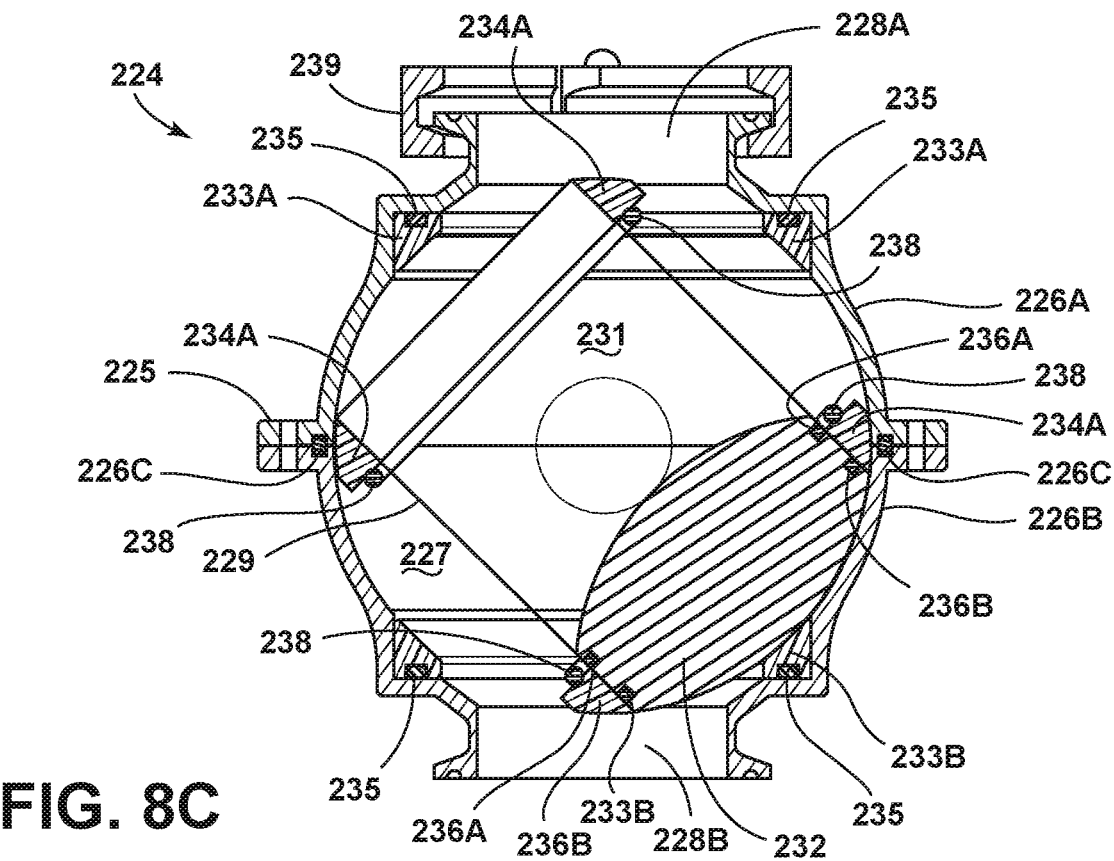
FIG. 8C is an elevational cross-sectional view of the sediment removal assembly of FIG. 8A with the sediment removal assembly in another operating position.
Figure 8D:
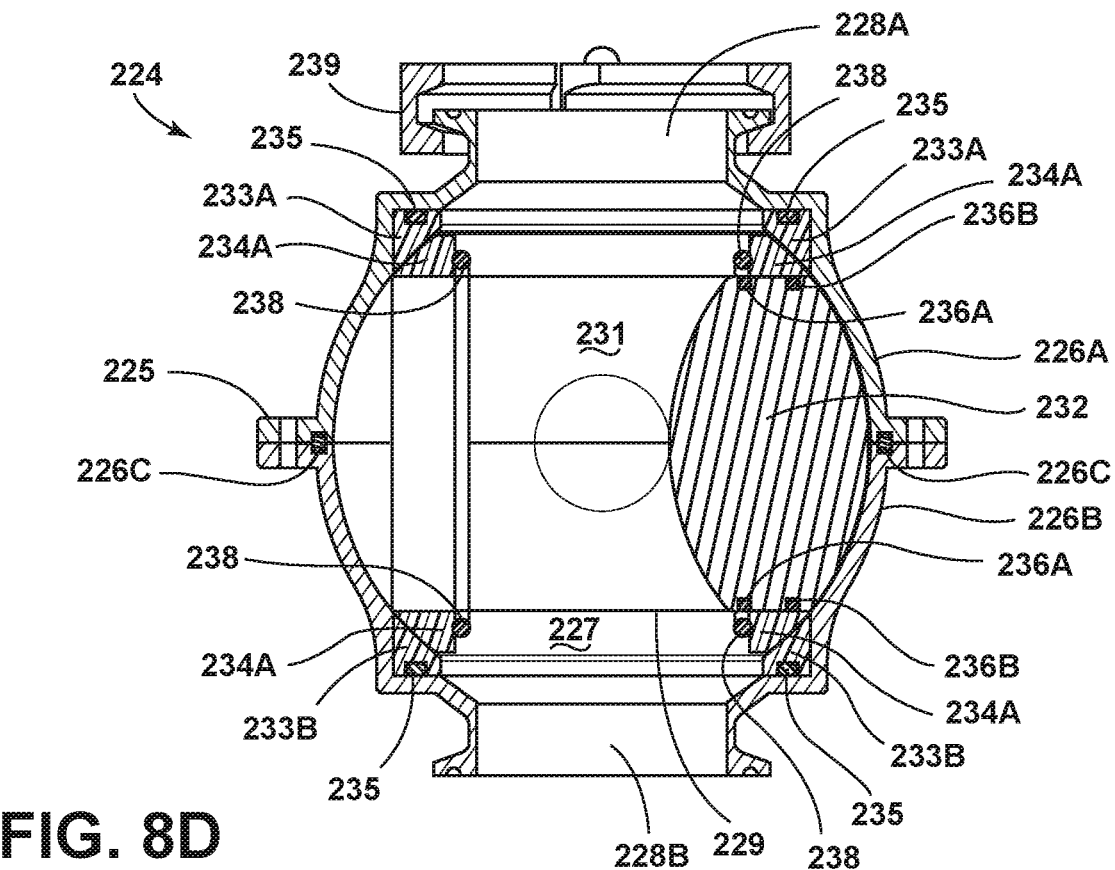
FIG. 8D is an elevational cross-sectional view of the sediment removal assembly of FIG. 8A with the sediment removal assembly in yet another operating position.
Figure 8E:
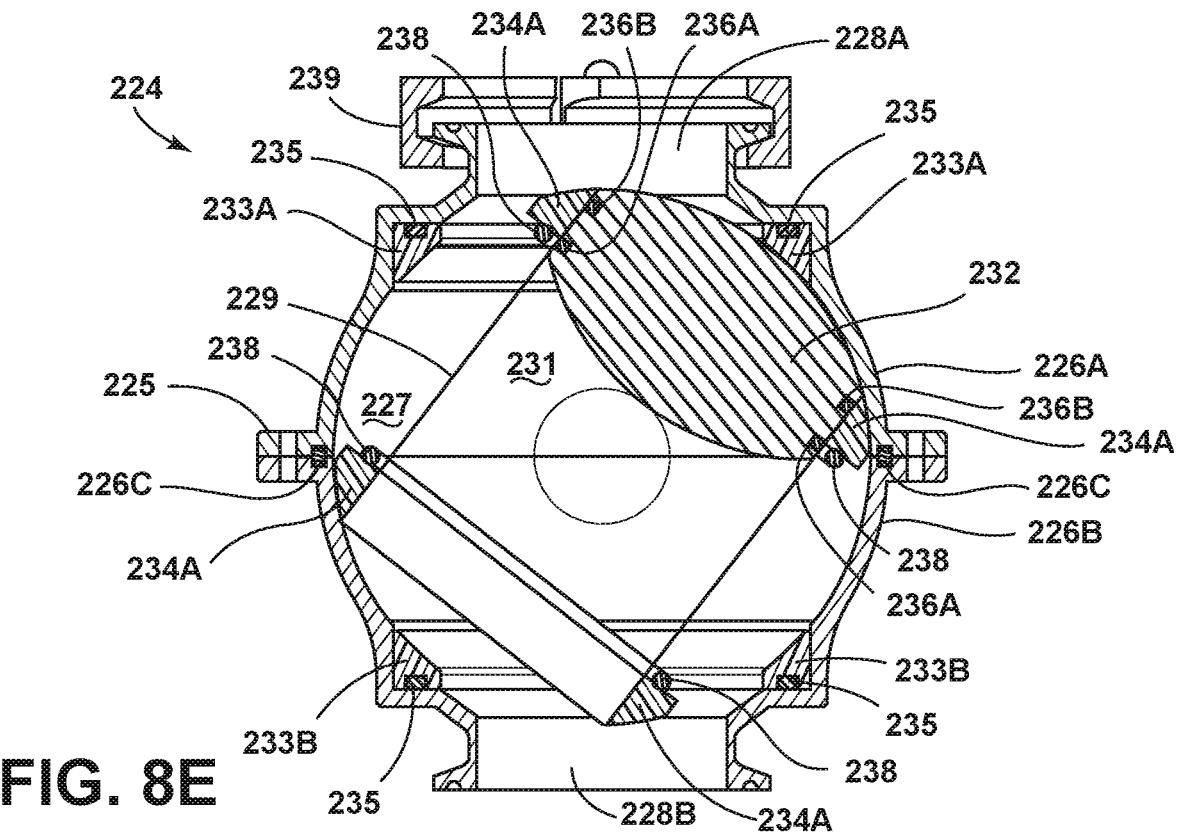
FIG. 8E is an elevational cross-sectional view of the sediment removal assembly of FIG. 8A with the sediment removal assembly in still another operating position.
Figure 8F:
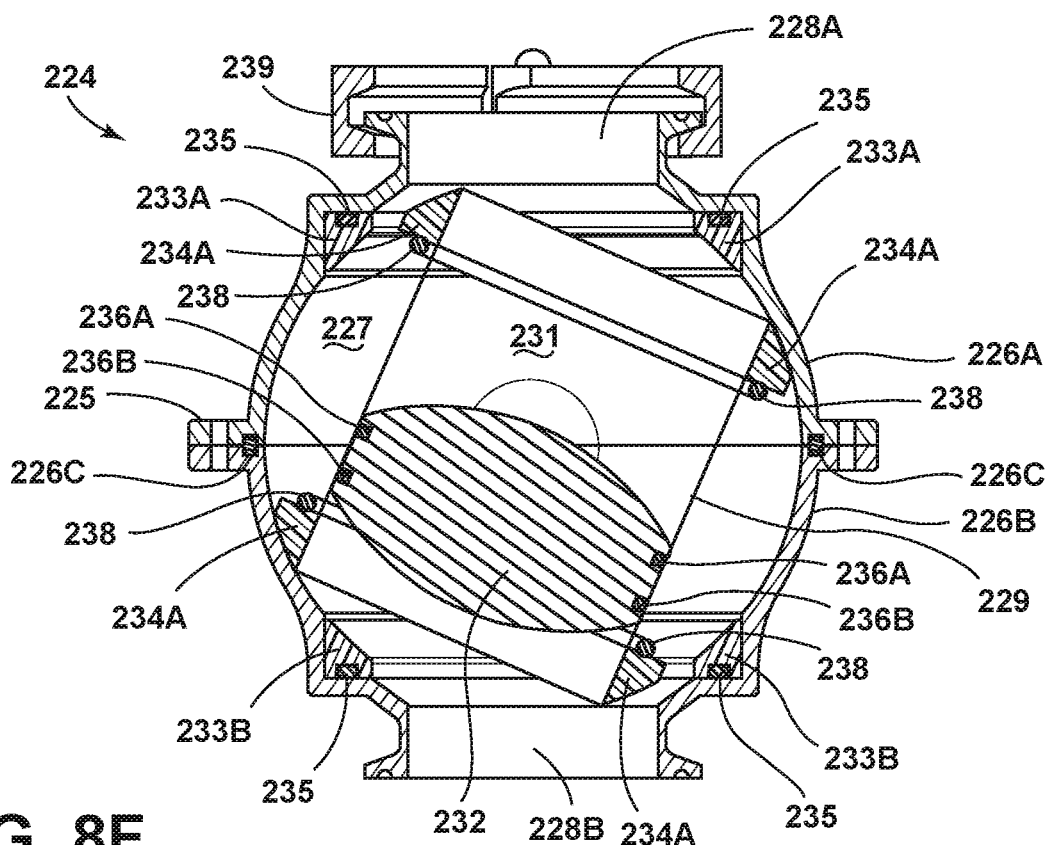
FIG. 8F is an elevational cross-sectional view of the sediment removal assembly of FIG. 8A with the sediment removal assembly in yet another position.
Figure 8G:
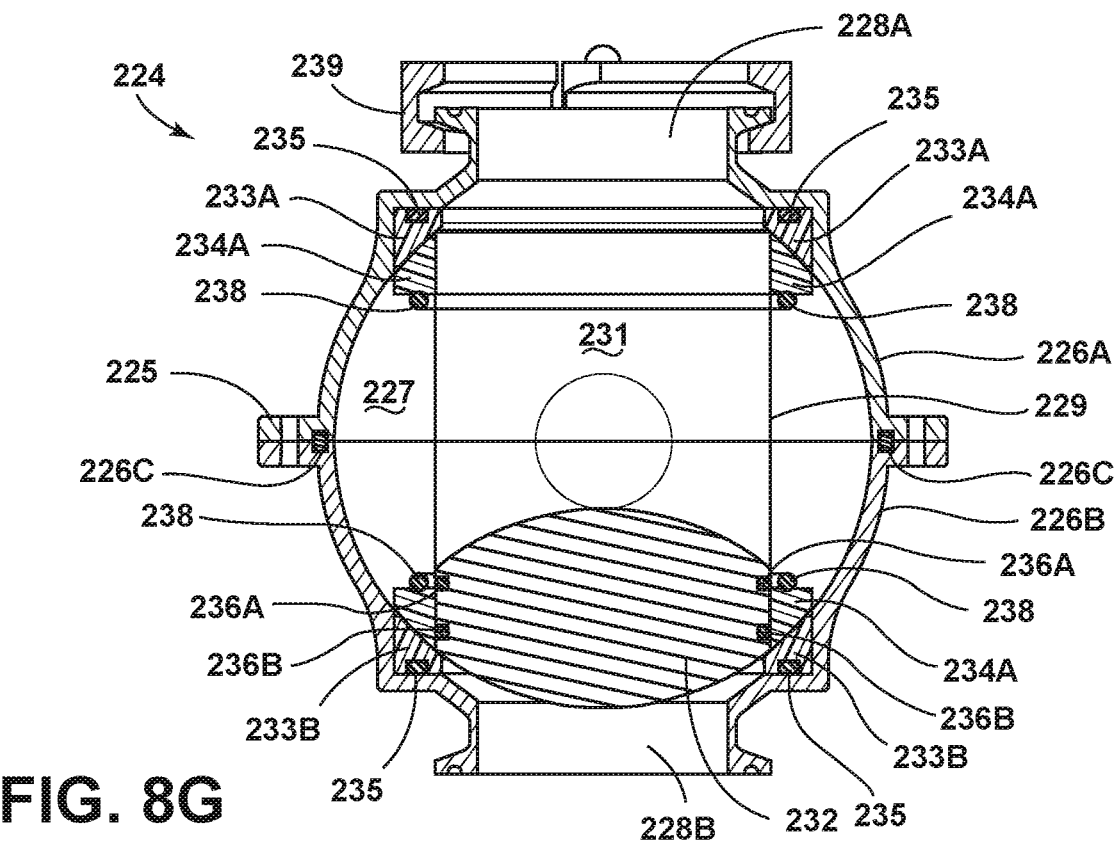
FIG. 8G is an elevational cross-sectional view of the sediment removal assembly of FIG. 8A with the sediment removal assembly in still another operating position.

With reference now to FIGS. 8A and 8B, initially, the stopper 232 is located in the lower portion 226B of the housing 225 and the handle 230 extends in a lateral direction. Over time, sediment collects above the stopper 232. When the sediment reservoir 231 becomes full, the handle 230 can be rotated (see FIGS. 8C-8F), which results in rotation of sediment reservoir 231 and the stopper 232 until the stopper 232 reaches the upper portion 226A of the housing 225. When the stopper 232 reaches the upper portion 226A of the housing 202 (FIG. 8E), pressure from inside the vessel 12 forces the stopper 232 move linearly downward (FIG. 8F), which results in sediment within the sediment reservoir 231 being ejected from within the sediment reservoir 231 out the bottom of the housing 225. This step can be repeated multiple times to remove sediment simply by rotating the handle 230 180 degrees. It is generally contemplated that the cylindrical sealing member 229 may be rotated in either direction to aid in forcing the stopper 232 downward, thus ejecting the collected sediment. This configuration prevents continuous flow from inside the vessel 12 to the outside environment. This concept also allows very little waste of the desired contents (the beverage) from the vessel 12.

Figure 11:
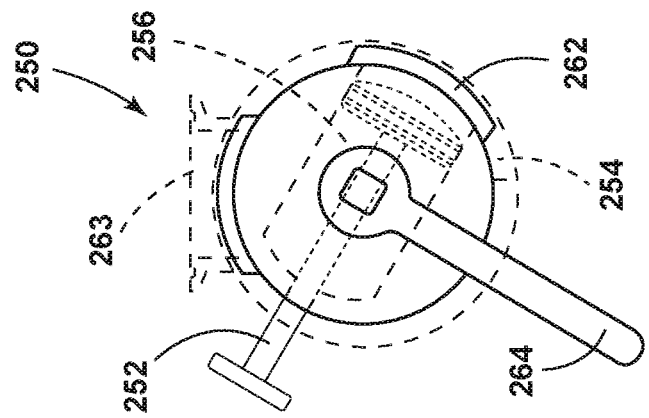
FIG. 11 is a front elevational view of the sediment removal assembly of FIG. 9 with the sediment removal assembly in a sediment discharge position.
Figure 10:
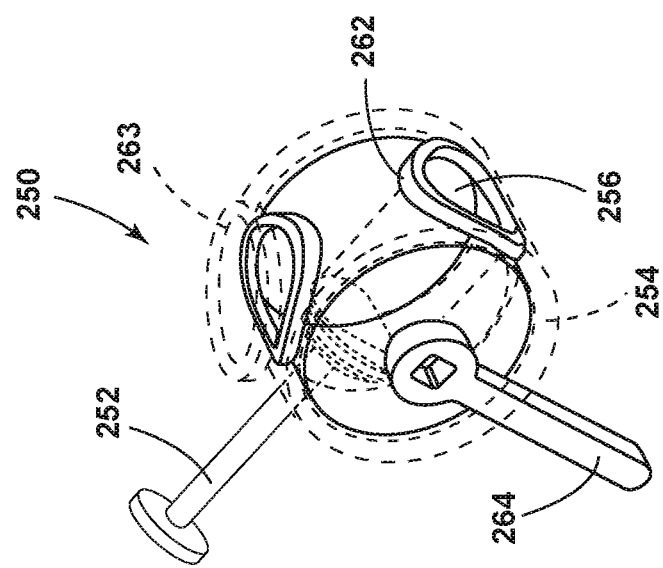
FIG. 10 is a top perspective view of the sediment removal assembly of FIG. 9 prior to discharging sediment.
Figure 9:
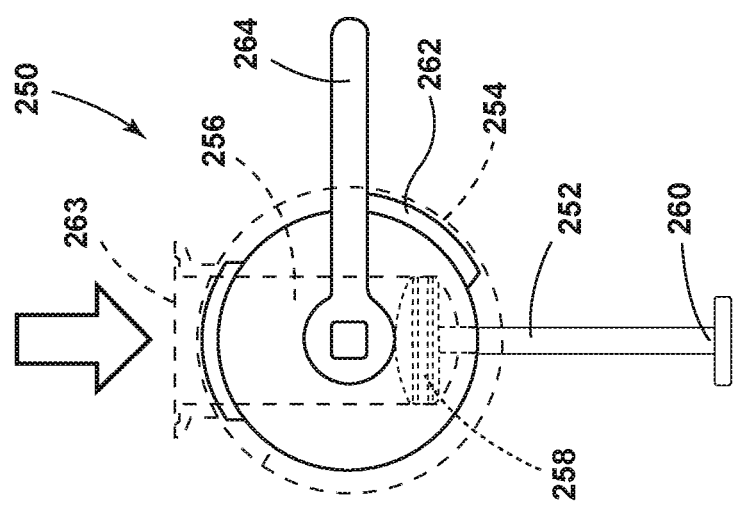
FIG. 9 is a front elevational view of another sediment removal assembly of the present disclosure with the sediment removal assembly in a sediment collection position.
Figure 12:
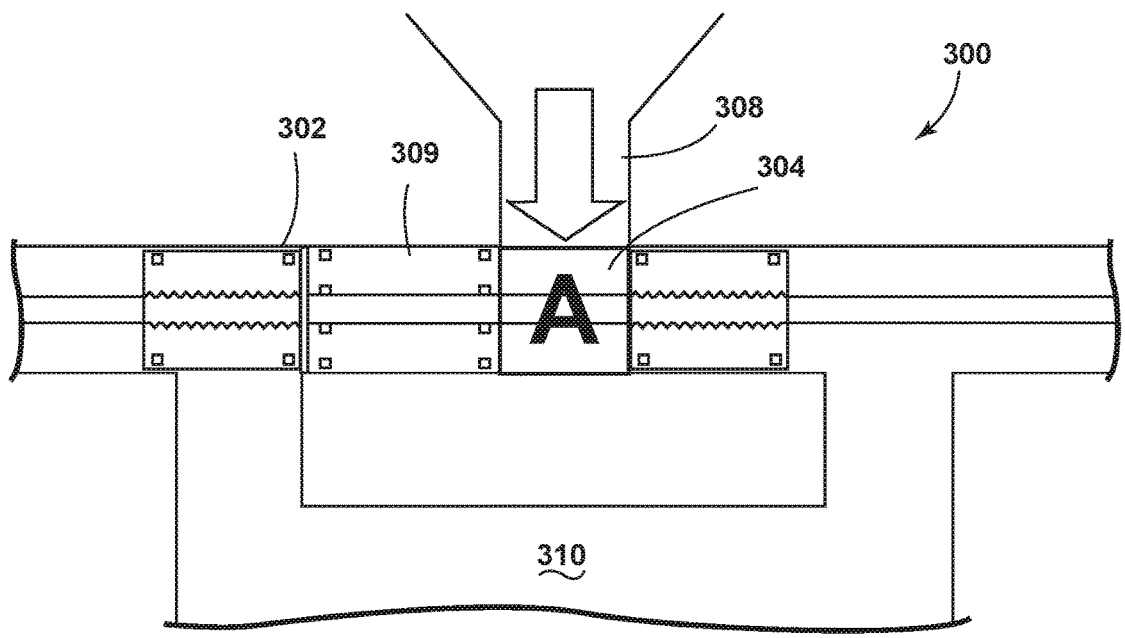
FIG. 12 is a schematic view of another embodiment of a sediment removal assembly of the present disclosure with a first chamber collecting sediment.

With reference now to the illustrated embodiment of FIGS. 9-11, a sediment removal assembly 250 includes a manual evacuation piston 252 that has a housing 254 defining an elongate sediment reservoir 256. The elongate sediment reservoir 256 includes a piston cylinder 258 and a piston plunger 260 extending downward therefrom. The piston cylinder 258 is located in a rotatable sealing member 262. Initially, the sediment reservoir 256 is aligned with an upper opening 263 of the housing 254. Sediment from inside the vessel 12 collects within the sediment reservoir 256. When enough sediment has been collected, a handle 264 can be used to rotate the sealing member 262 to a predetermined angle. The piston plunger 260 can then be pushed inwardly toward the housing 254, resulting in evacuation of sediment from inside the sediment reservoir 256. Once the sediment has been removed from the sediment reservoir 256, the handle 264 can be used to rotate the sealing member 262 back to a position that aligns the sediment reservoir 256 with an upper opening of the housing 254. These steps can be repeated as many times as necessary to remove all unwanted sediment.

Figure 13:
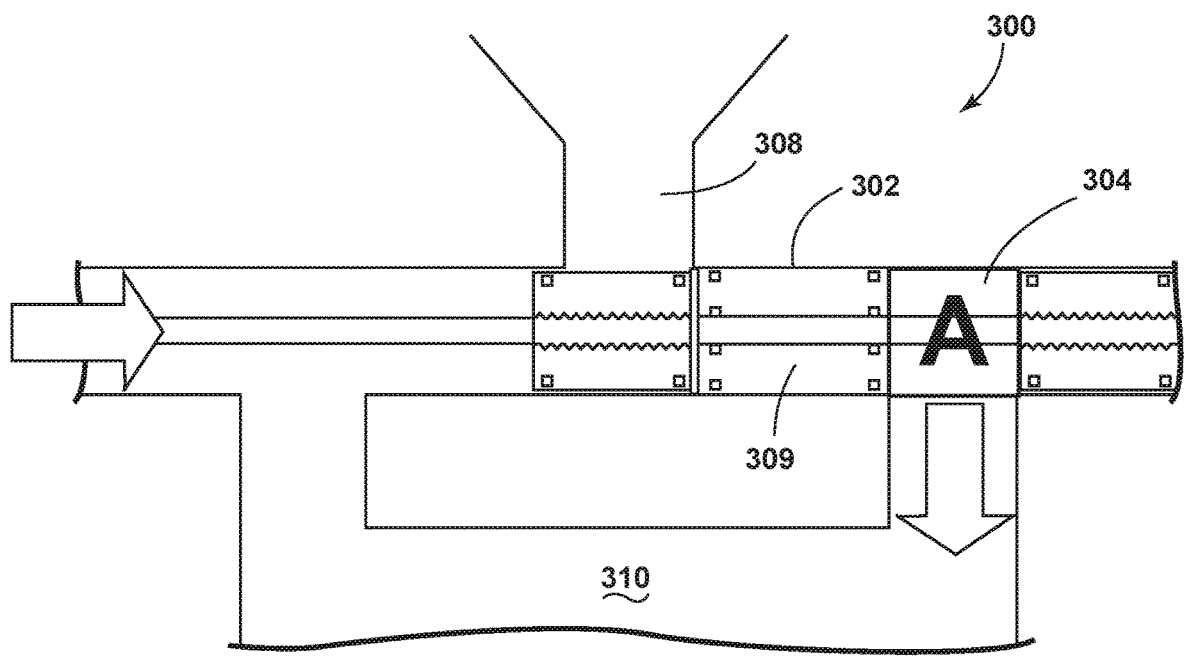
FIG. 13 is a schematic view of the sediment removal assembly of FIG. 12 with the first chamber discharging sediment.
Figure 14:
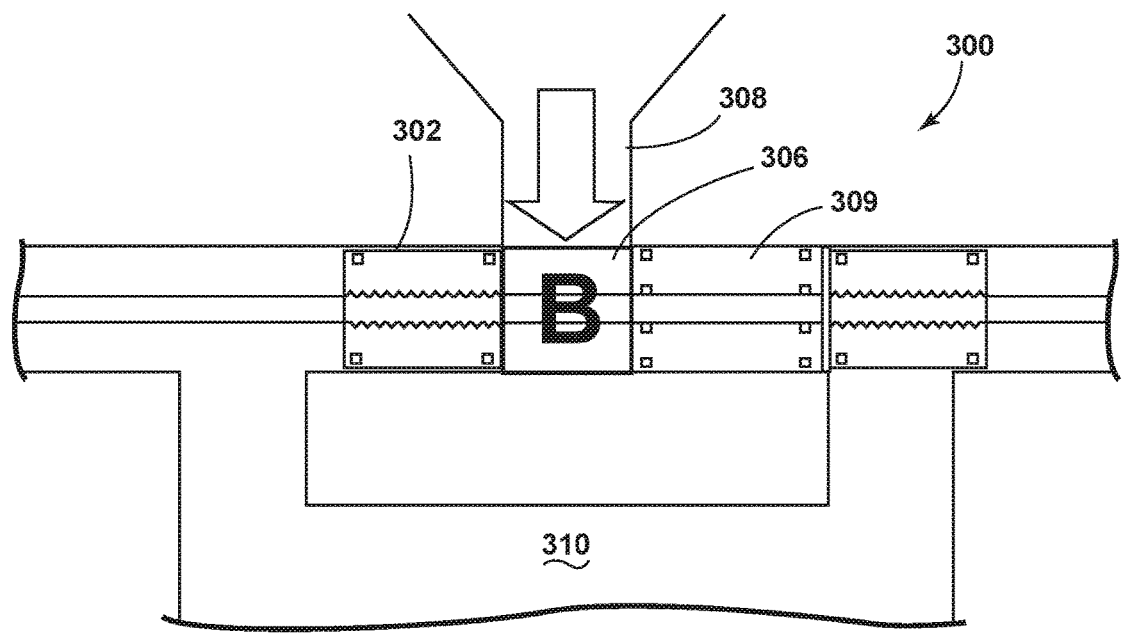
FIG. 14 is a schematic view of the sediment removal assembly of FIG. 12 during collection of sediment in a second chamber.
Figure 15:
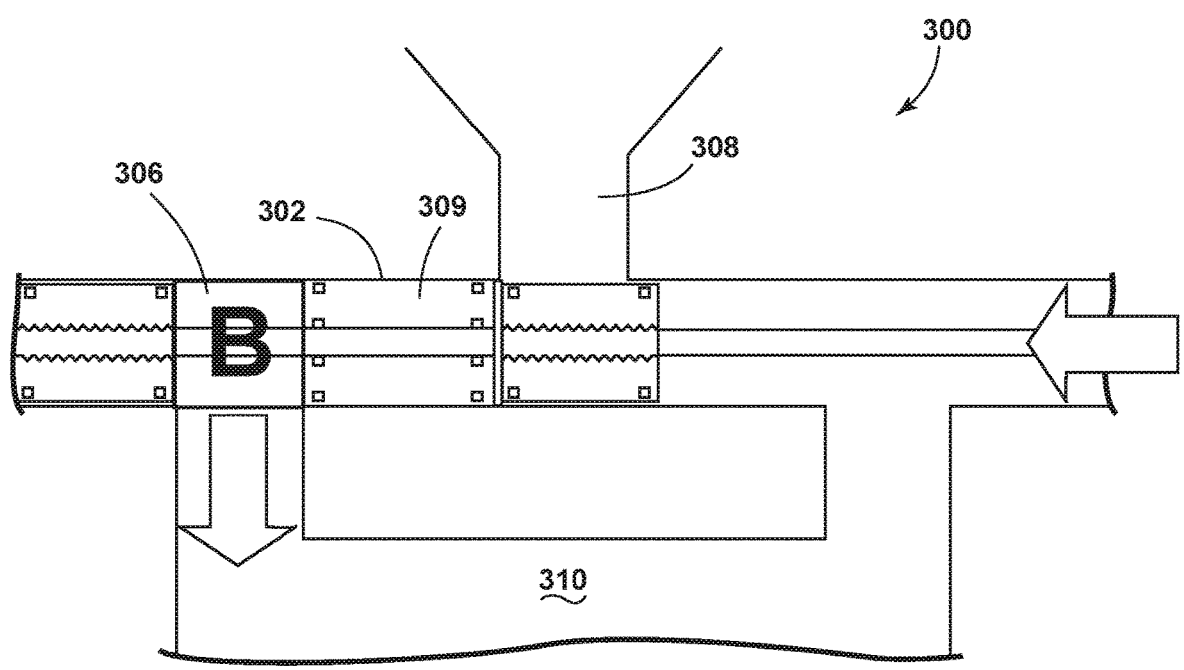
FIG. 15 is a schematic view of the sediment removal assembly of FIG. 12 with the second chamber discharging sediment.

With reference now to FIGS. 12-15, a sediment removal assembly 300 is illustrated. The sediment removal assembly 300 includes a horizontal piston assembly 302 that generally defines first and second chambers 304, 306 configured to receive sediment. The first chamber 304 is aligned with a discharge port 308 of the vessel 12. When a sufficient amount of sediment has filled the first chamber 304, the piston assembly 302 slides to one side, with a center divider 309 sealing off the first chamber 304, and at the same time sealing off a bottom of the discharge port 308. The sediment within the first chamber 304 is then dumped into a collection bin 310 (FIG. 13). After the sediment has been dumped into the collection bin 310, the second chamber 306 is then aligned with the discharge portion 308 at the bottom of the vessel 12 (FIG. 14). The second chamber 306 then begins to fill with sediment in the same way that the first chamber 304 did. Once the second chamber 306 is full of sediment, a user pushes the piston assembly 302 back to the start position, which seals off the second chamber 306 and dumps the sediment into the collection bin 310. At the same time the second chamber 306 is dumped of collected sediment (FIG. 15), the first chamber 304 is once again aligned with the discharge port 308 at the bottom of the vessel 12 such that additional sediment can be deposited into the first chamber 304. The process can be repeated as many times as necessary until all the sediment has been evacuated from the vessel 12.

The embodiment as set forth with reference to FIGS. 12-15 allows sediment to settle into one of the first and second chambers 304, 306 below the vessel 12. This multichamber configuration has two main benefits. First, this system reduces the volume of sediment that is removed at one time, allowing for finer control of the process, and reducing the amount of beverage that is wasted. In addition, the floating center divider 309 of the piston assembly 302 ensures that no oxygen is introduced into the system, as each chamber 304, 306 closes after dumping sediment and before reentering the vessel 12.

Figure 16:
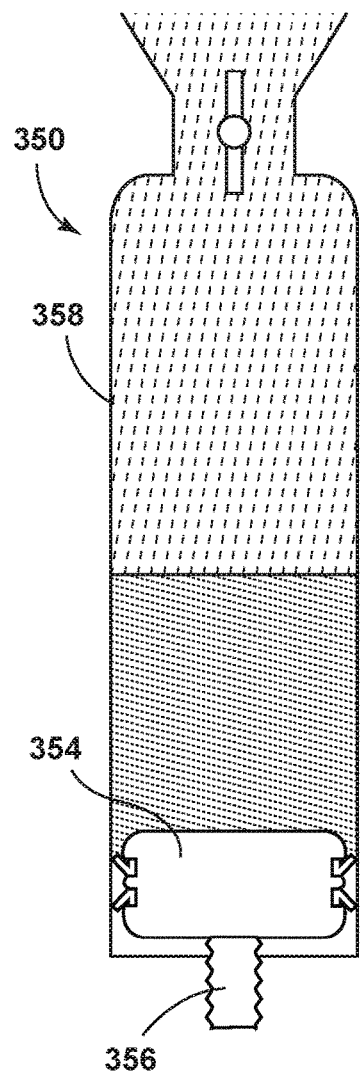
FIG. 16 is a schematic view of another embodiment of the sediment removal assembly of the present disclosure with a screw piston in a lower position.
Figure 17:
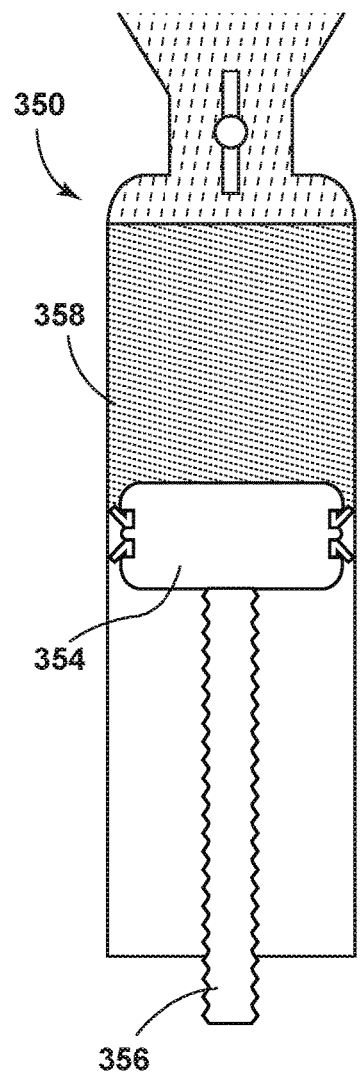
FIG. 17 is a schematic view of the sediment removal assembly of FIG. 16 with the screw piston in a raised position.
Figure 18:
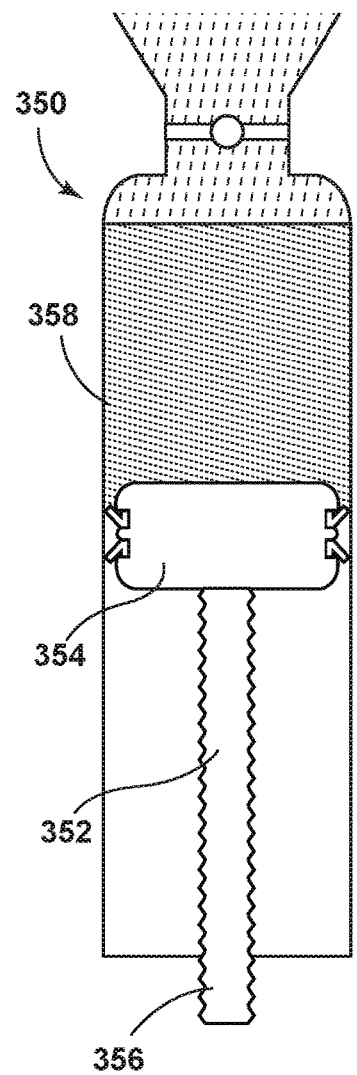
FIG. 18 is a schematic view of the sediment removal assembly of FIG. 16 prior to removal of sediment from the sediment removal assembly.

With reference now to FIGS. 16-18, a sediment removal assembly 350 is illustrated, which includes a screw piston 352 that is set at a lower portion of a collection reservoir 358. The screw piston 352 includes a stopper 354 and a screw drive 356 coupled with the stopper 354. After a predetermined time, and once sufficient sediment has entered the collection reservoir 358, the screw piston 352 can be activated, thereby driving the screw drive 356 to an elevated position. The elevated position corresponds to a position that has forced a majority of the beverage out of the collection reservoir 358 such that only sediment generally remains. An upper portion of the collection reservoir 358 can then be closed off from fluid communication with the vessel 12 and the collection reservoir 358 can be removed, or the screw drive 356 and the stopper 354 can be removed to expose the sediment. The sediment within the collection reservoir 358 can then be disposed of and the collection reservoir 358 can be reinstalled onto the vessel 12. This configuration allows the sediment to settle to a desired depth and has several important benefits. The volume of the sediment compartment is flexible ensuring only the sediment is extracted, minimal beverage is wasted, and the screw piston can be returned to the system in a fully compressed state ensuring that no oxygen is introduced into the system. The piston can be used to squeeze the sediment out once removed, making it much easier to clean than traditional methods.

Figure 19:
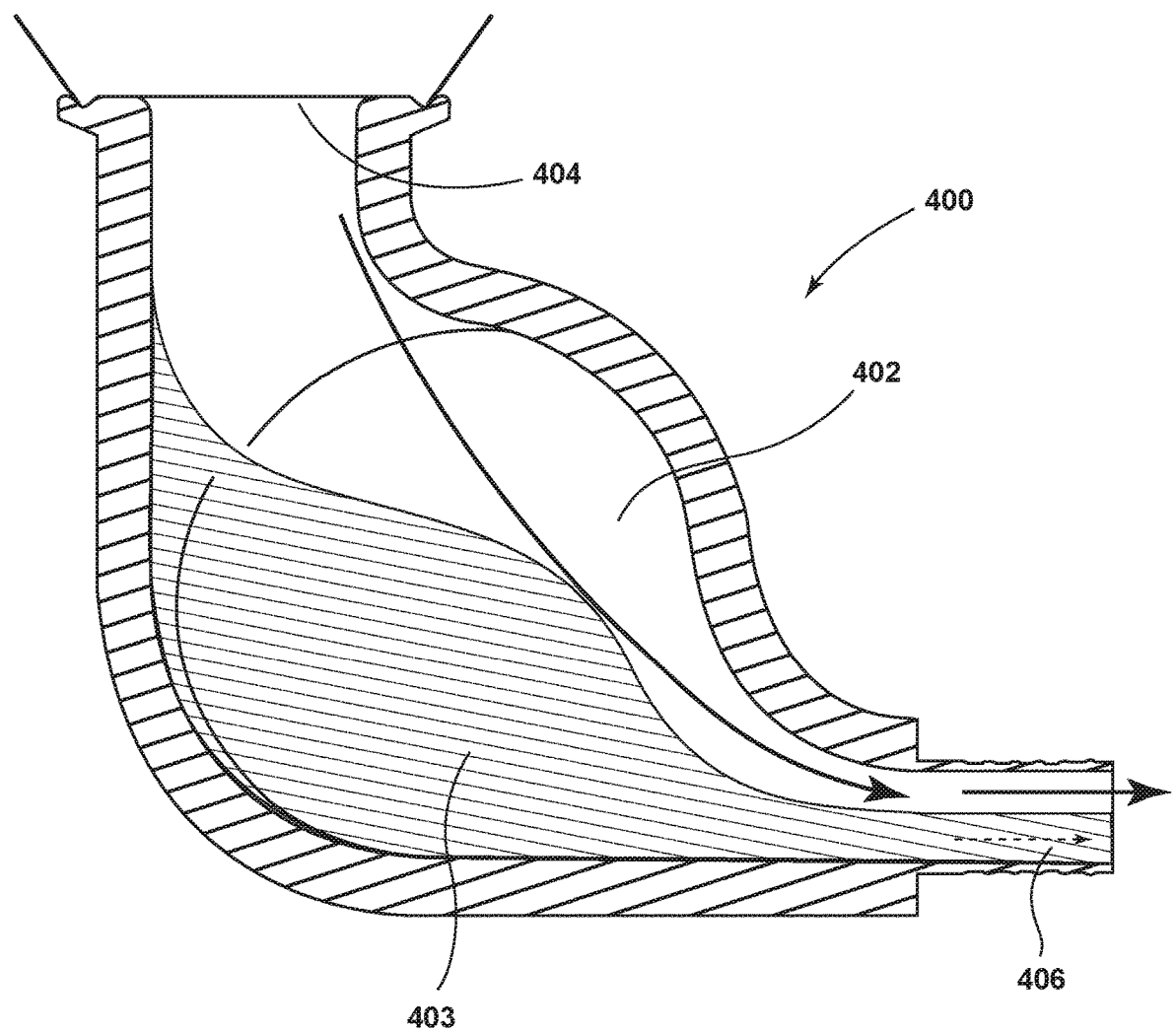
FIG. 19 is a side elevational cross-sectional view of another embodiment of a sediment removal assembly of the present disclosure during collection of sediment.
Figure 20:
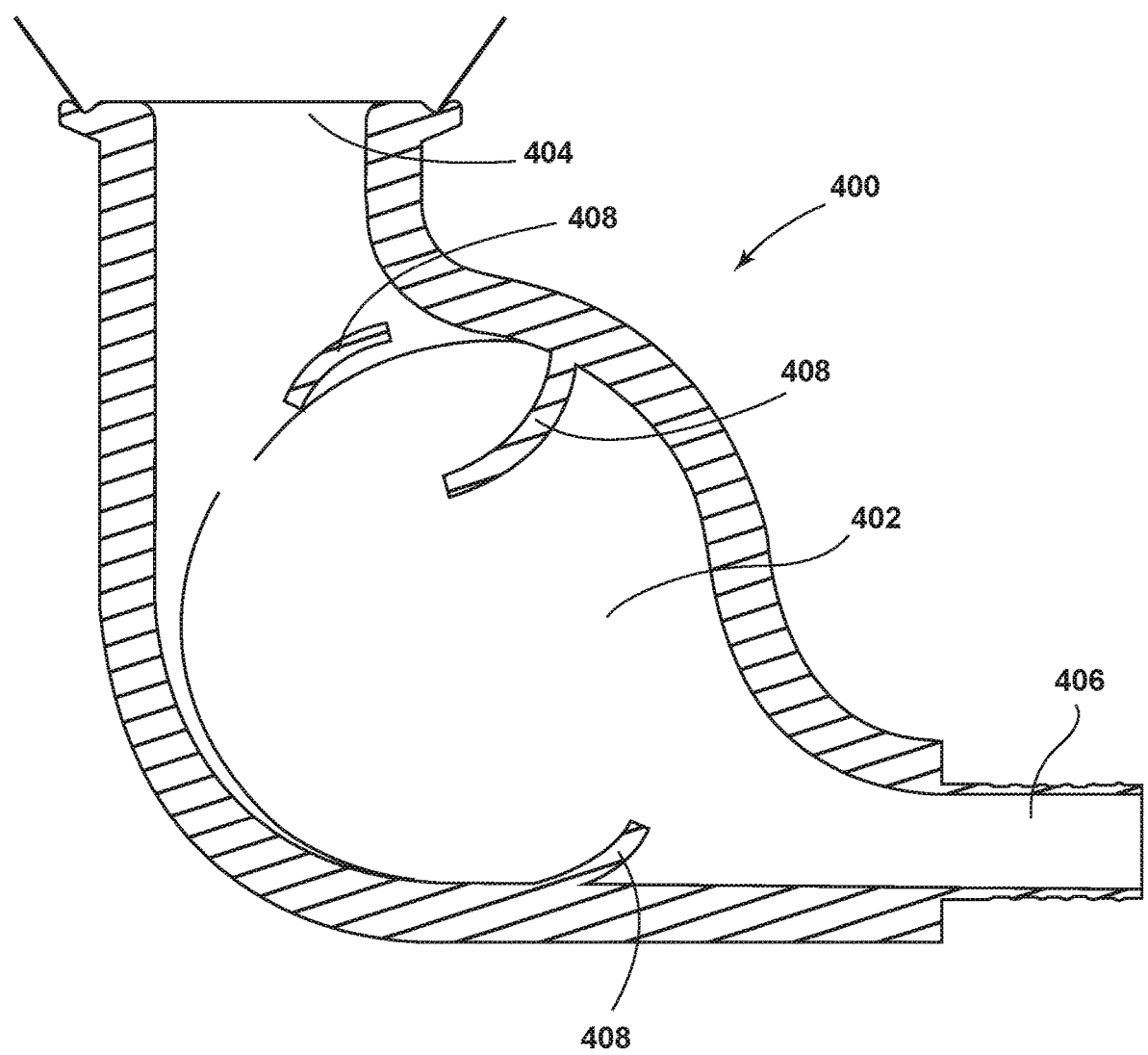
FIG. 20 is a side elevational cross-sectional view of the sediment removal assembly of FIG. 19 prior to sediment collection.
Figure 21:
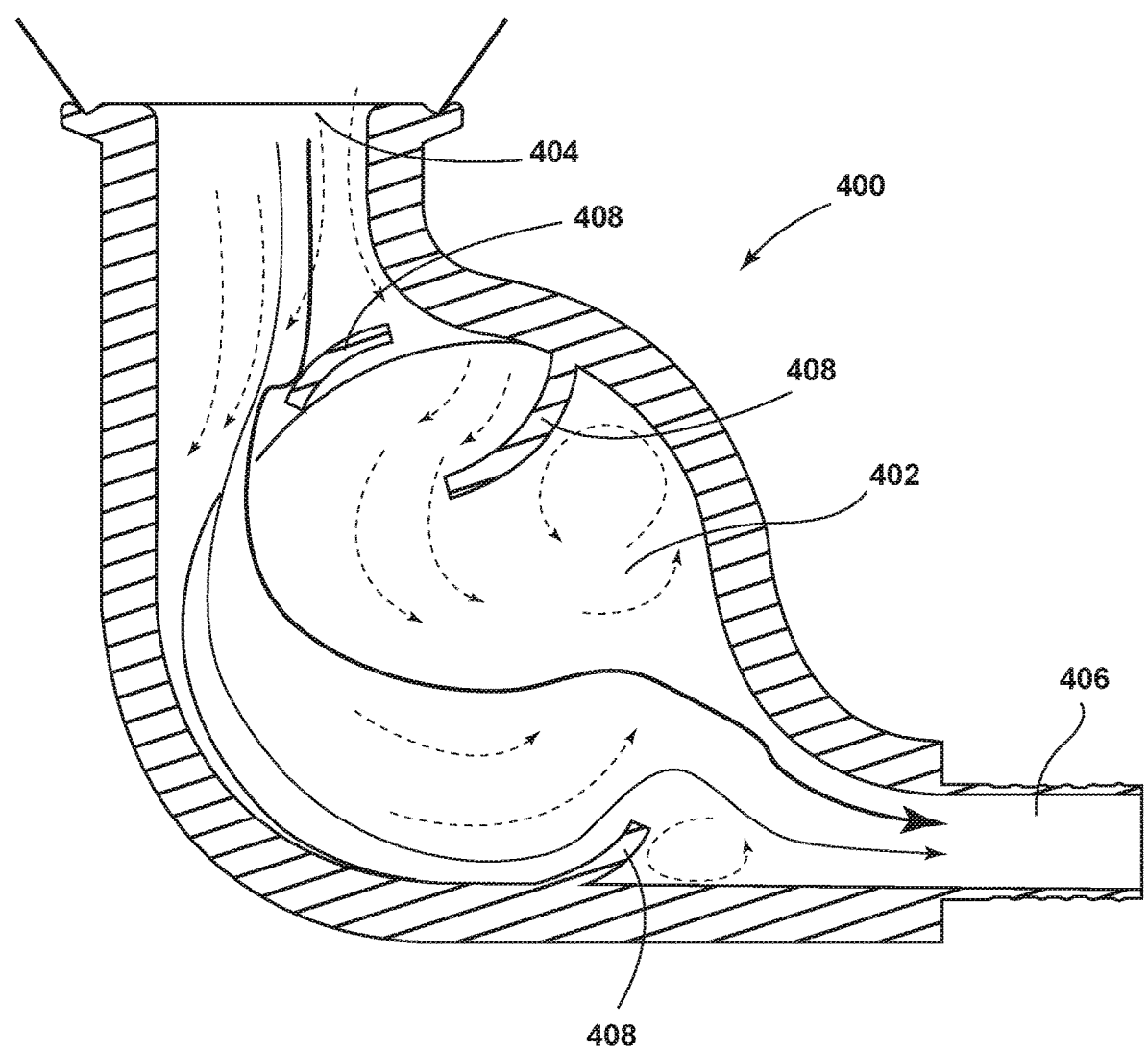
FIG. 21 is a side elevational cross-sectional view of the sediment removal assembly of FIG. 19 during discharge of sediment from the sediment removal assembly.
Figure 22:
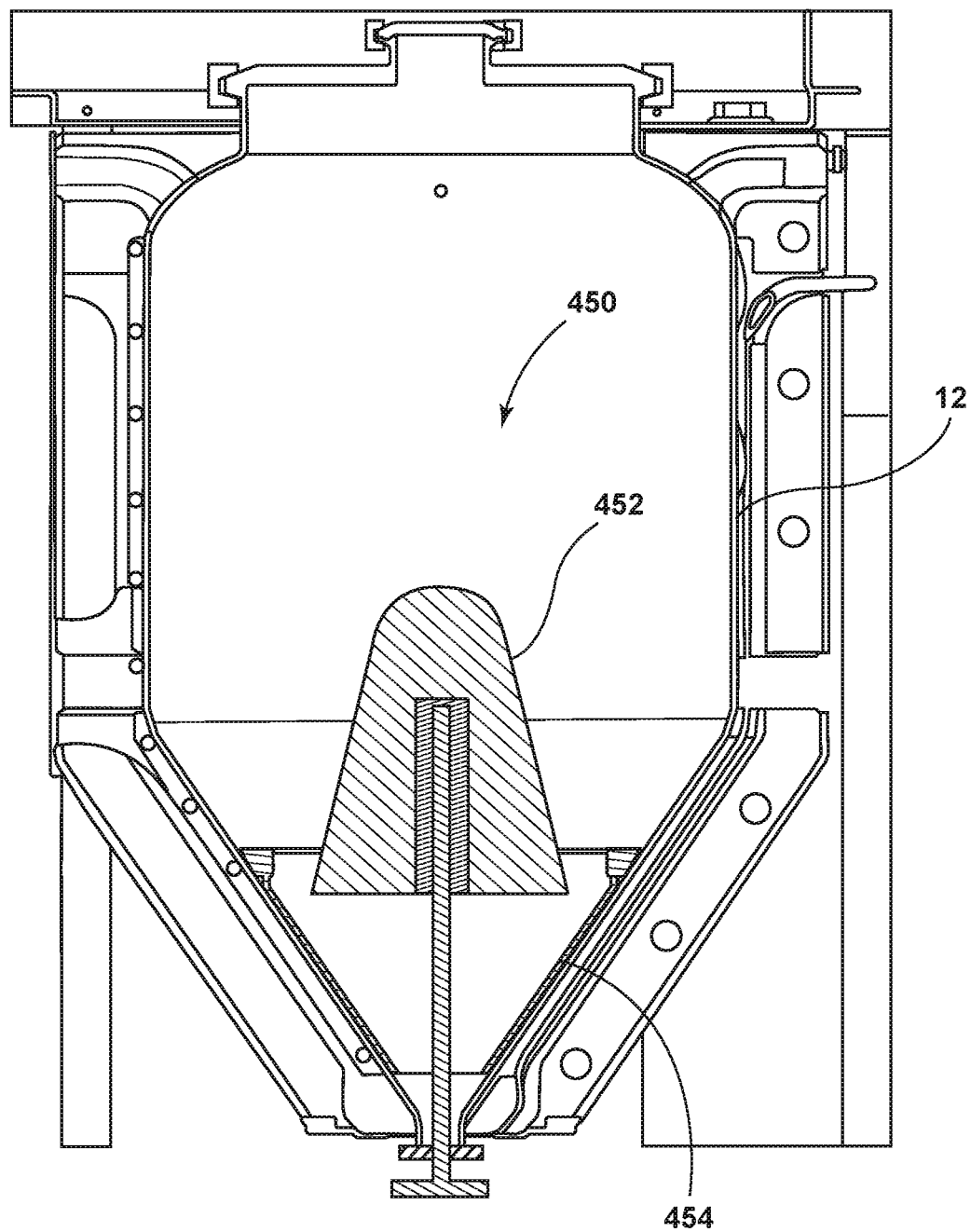
FIG. 22 is a front elevational cross-sectional view of another embodiment of a sediment removal assembly of the present disclosure.

With reference now to FIGS. 19-21, a sediment removal assembly 400 is illustrated. The sediment removal assembly 400 includes a bulbous mixing reservoir 402 that allows for collection of sediment 403 within the bulbous mixing reservoir 402. Once the bulbous mixing reservoir 402 has been filled with sediment 403, beverage flow can be administered from a top opening 404 of the bulbous mixing reservoir 402 from the vessel 12, thereby forcing sediment 403 out through a lower opening 406. As shown in FIG. 20, mixing vanes 408 are disposed inside the bulbous mixing reservoir 402. The mixing vanes 408 are strategically positioned to allow for turbulence and movement of the beverage, while also forcing sediment 403 out of the bulbous mixing reservoir 402 through the lower opening 406. Turbulent flow forces a majority of the sediment 403 out and the flow can be stopped, resulting in settling of the beverage in sediment 403 until a predetermined volume of sediment 403 has once again been collected. At this point, the process can be repeated to remove additional sediment 403. This configuration eliminates any tunnel effect that can occur when the beverage is drained from the vessel 12. Tunnel effect results when the beverage tunnels through portions of the sediment when the vessel is allowed to drain. Consequently, much sediment remains, but some of the beverage is lost. The mixing and stirring caused by the vanes of this configuration creates turbulence that mixes the sediment with the liquid before exiting the system. The top opening 404 is maintained in an open position so that sediment can collect in the bulbous mixing reservoir. Beverage flow occurs at or downstream of the lower opening 406.

Figure 23:
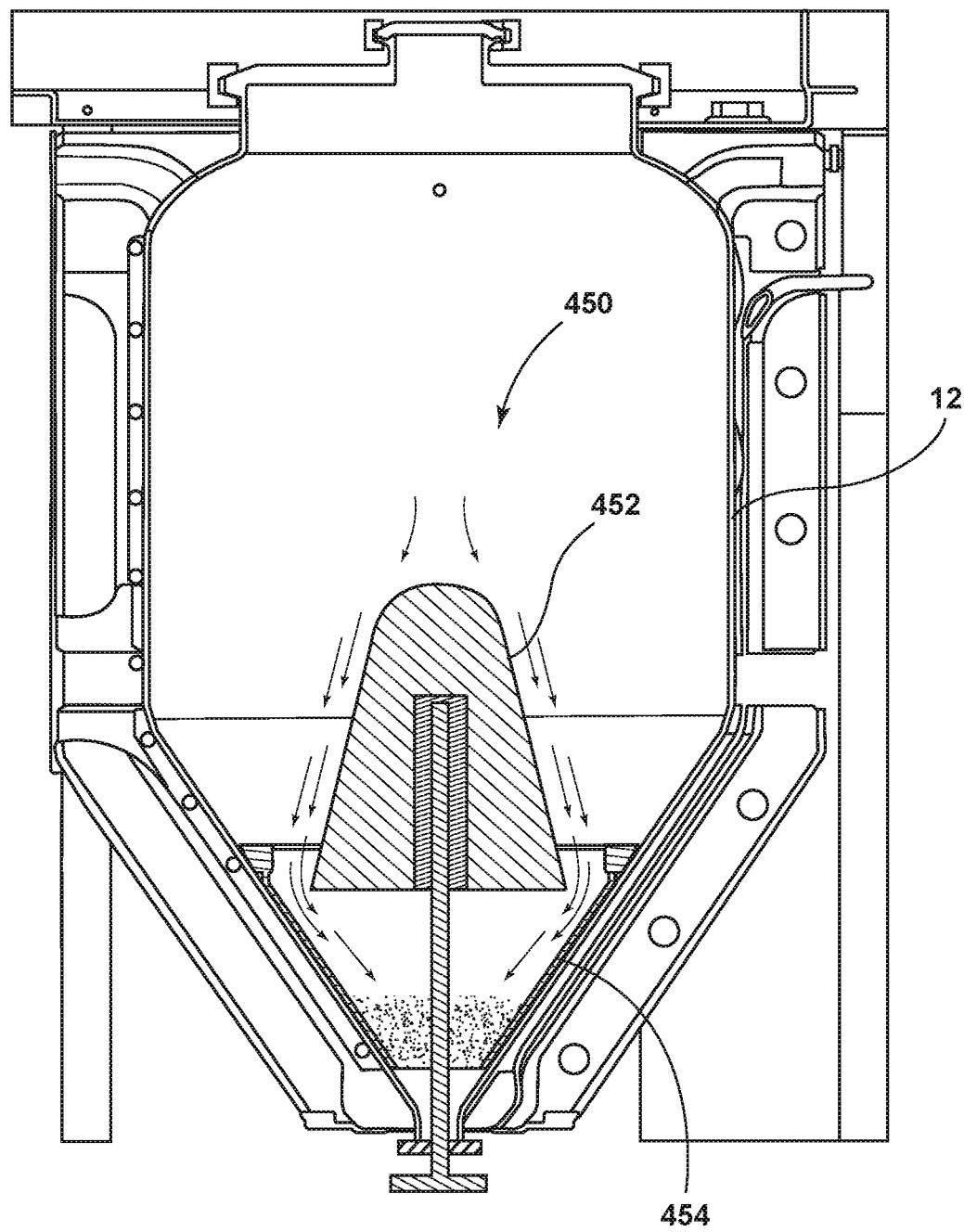
FIG. 23 is a front elevational cross-sectional view of the sediment removal assembly of FIG. 22 during collection of sediment.
Figure 24:
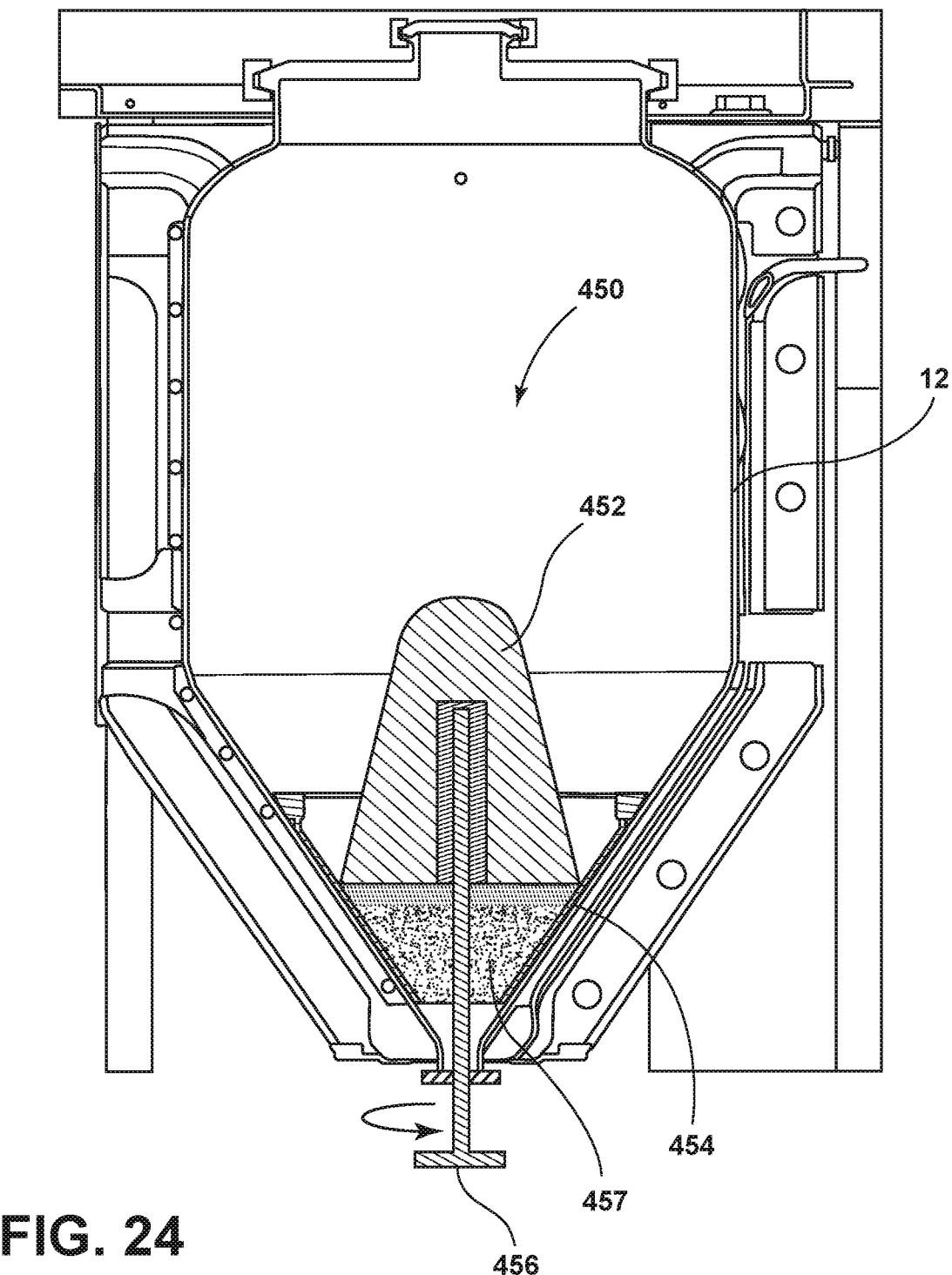
FIG. 24 is a front elevational cross-sectional view of the sediment removal assembly of FIG. 22 after isolation of the sediment between a basket and isolator.
Figure 25:
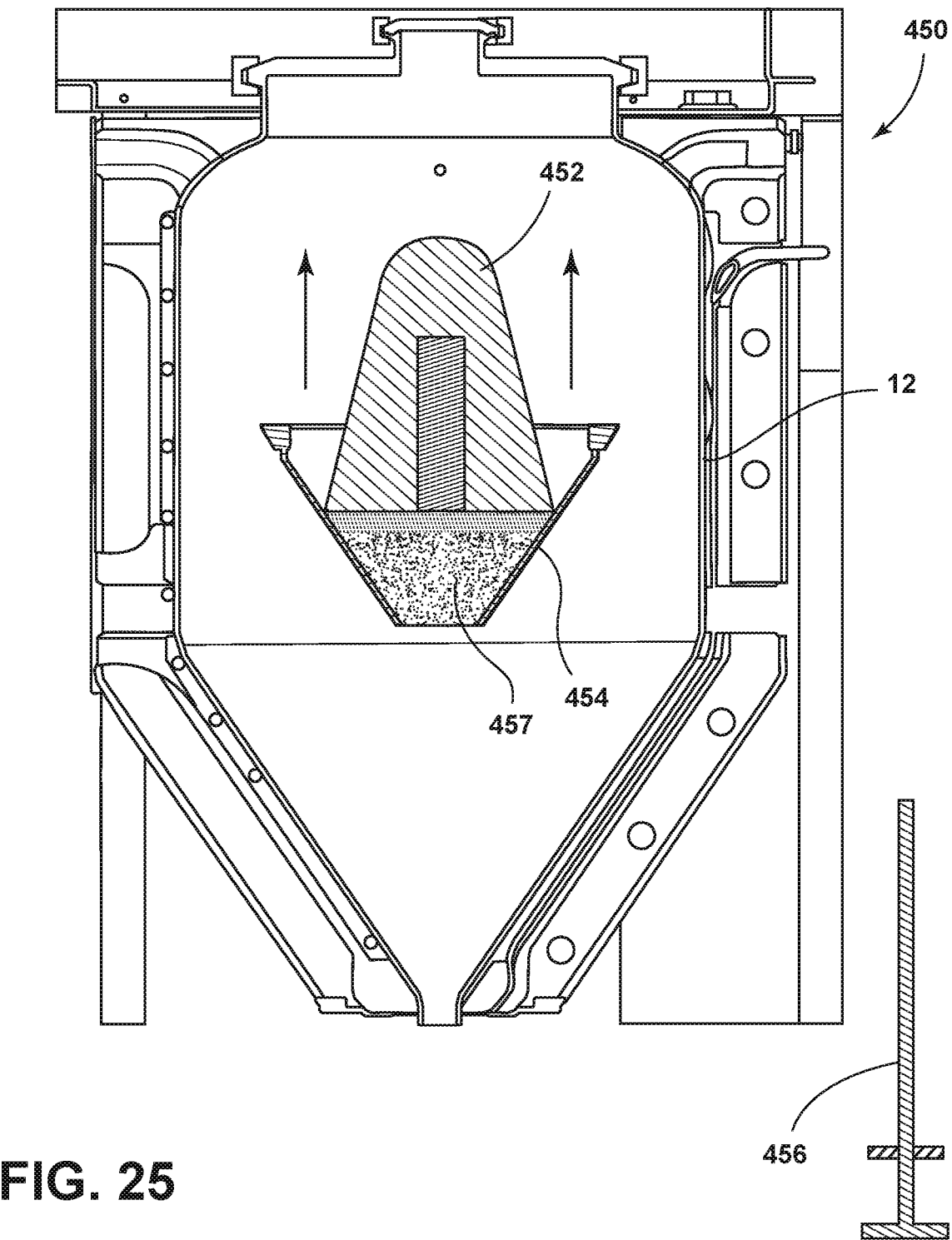
FIG. 25 is a front elevational cross-sectional view of the sediment removal assembly of FIG. 22 during removal of the sediment from the vessel.

With reference now to FIGS. 22-25, a sediment removal assembly 450 is illustrated that includes an isolator 452 and a basket 454 disposed inside the vessel 12. A screw or knob 456 is disposed below the isolator 452 and is operably coupled therewith. As shown in FIG. 23, over time, sediment 457 settles into the basket 454 around the isolator 452. Once the sediment 454 has been isolated and collects in the basket 454, the isolator 452 is drawn down into the basket 454 (FIG. 24), thereby confining the sediment 457 between the isolator 452 and the basket 454. After the beverage dispensing is complete from the vessel 12, the full sediment basket 454 and the isolator 452 can be removed (FIG. 25) along with the sediment 457 collected therein. Once the sediment 457 has been disposed of, the basket 454 and the isolator 452 can be reinstalled back into the vessel 12 and the screw or knob 456 can be reinstalled back into the basket 454 and the isolator 452. The sediment removal assembly 450 does not require the system to be depressurized thus exposing beer to the atmosphere. Additionally, this configuration is cleaner and only requires user interaction to discard the sediment during the cleaning/sanitizing phase.

Figure 26:
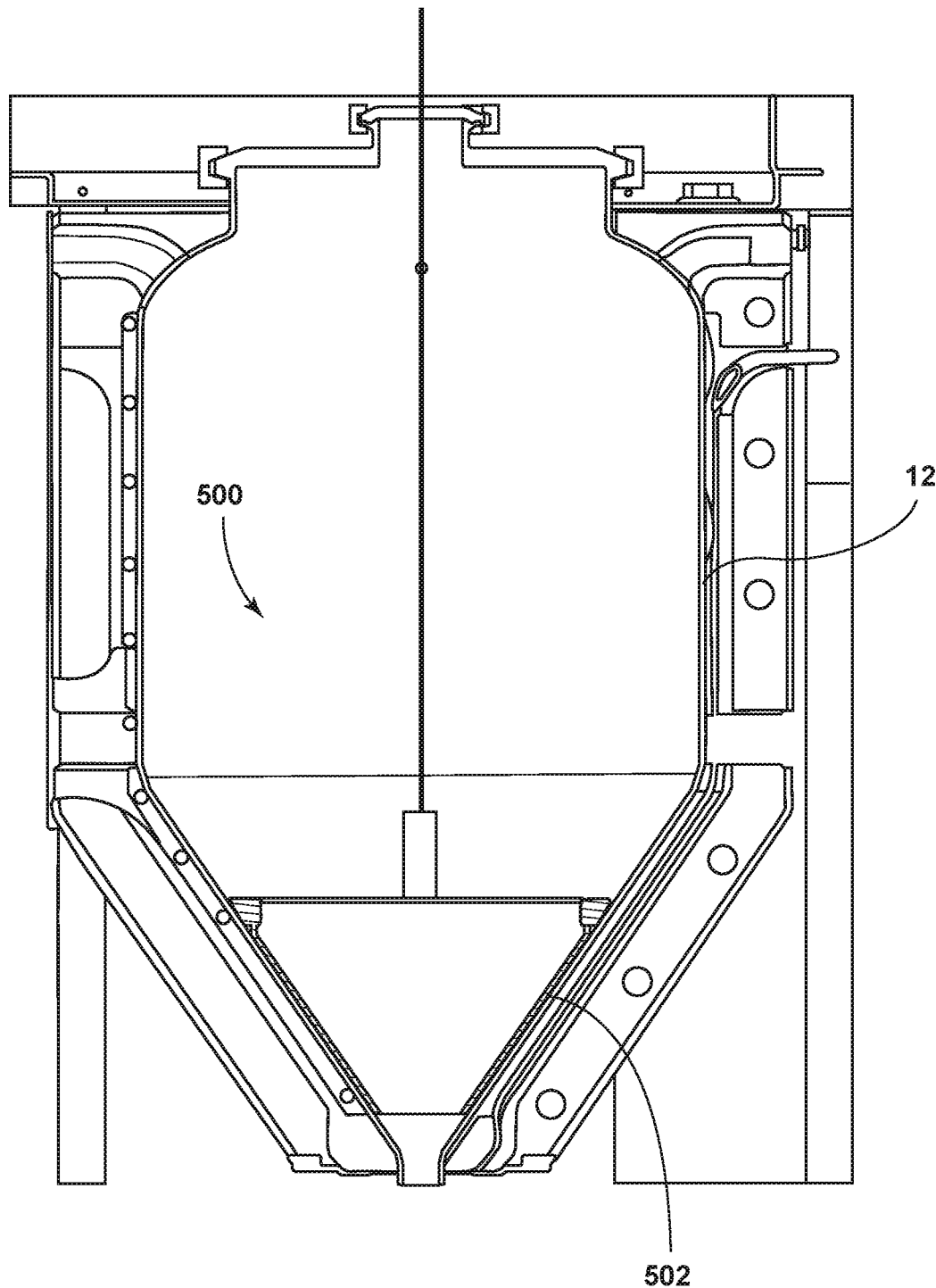
FIG. 26 is a front elevational cross-sectional view of another embodiment of a sediment removal assembly of the present disclosure.
Figure 27:
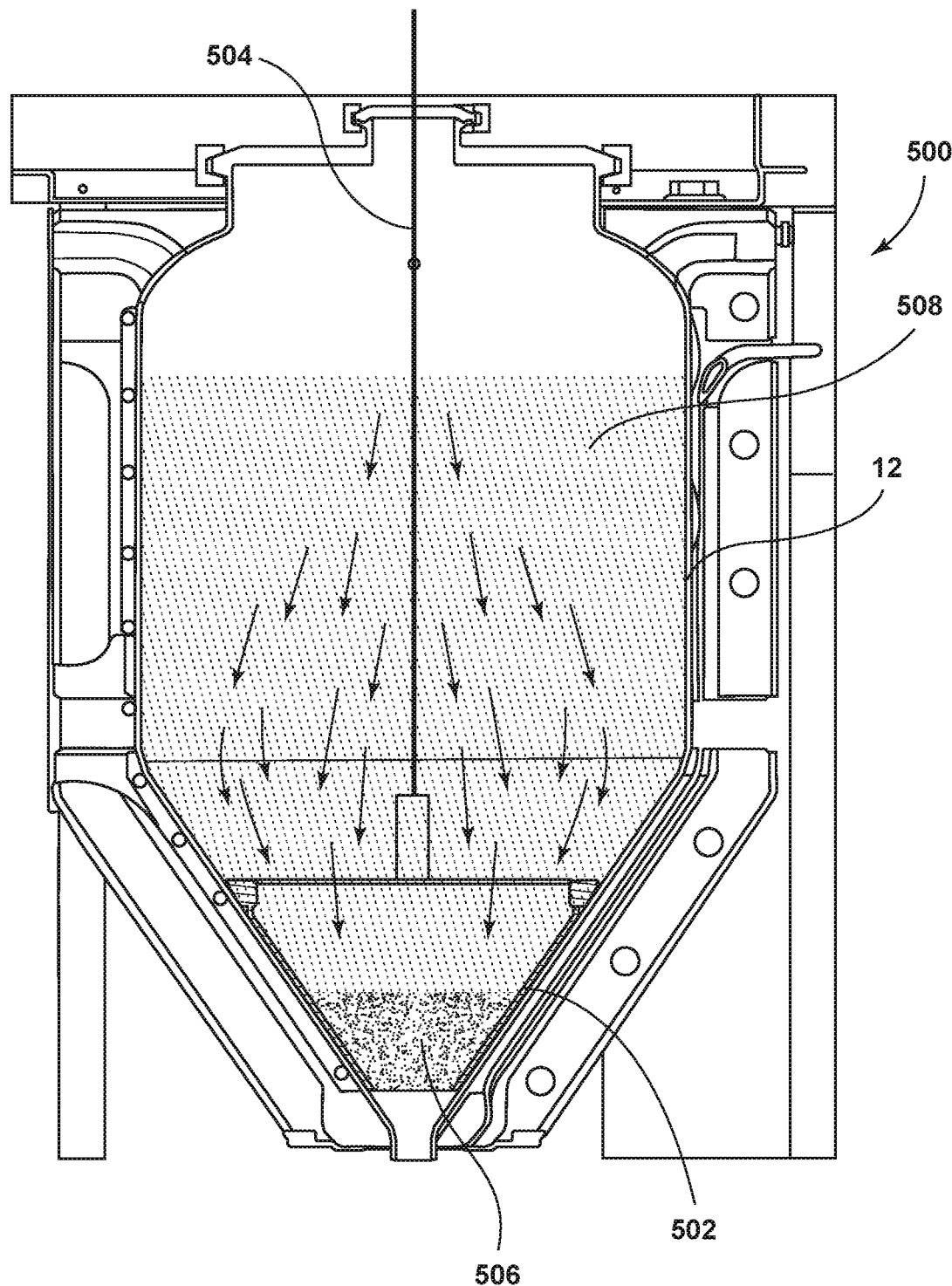
FIG. 27 is a front elevational cross-sectional view of the sediment removal assembly of FIG. 26 during collection of sediment in a filter basket.
Figure 28:
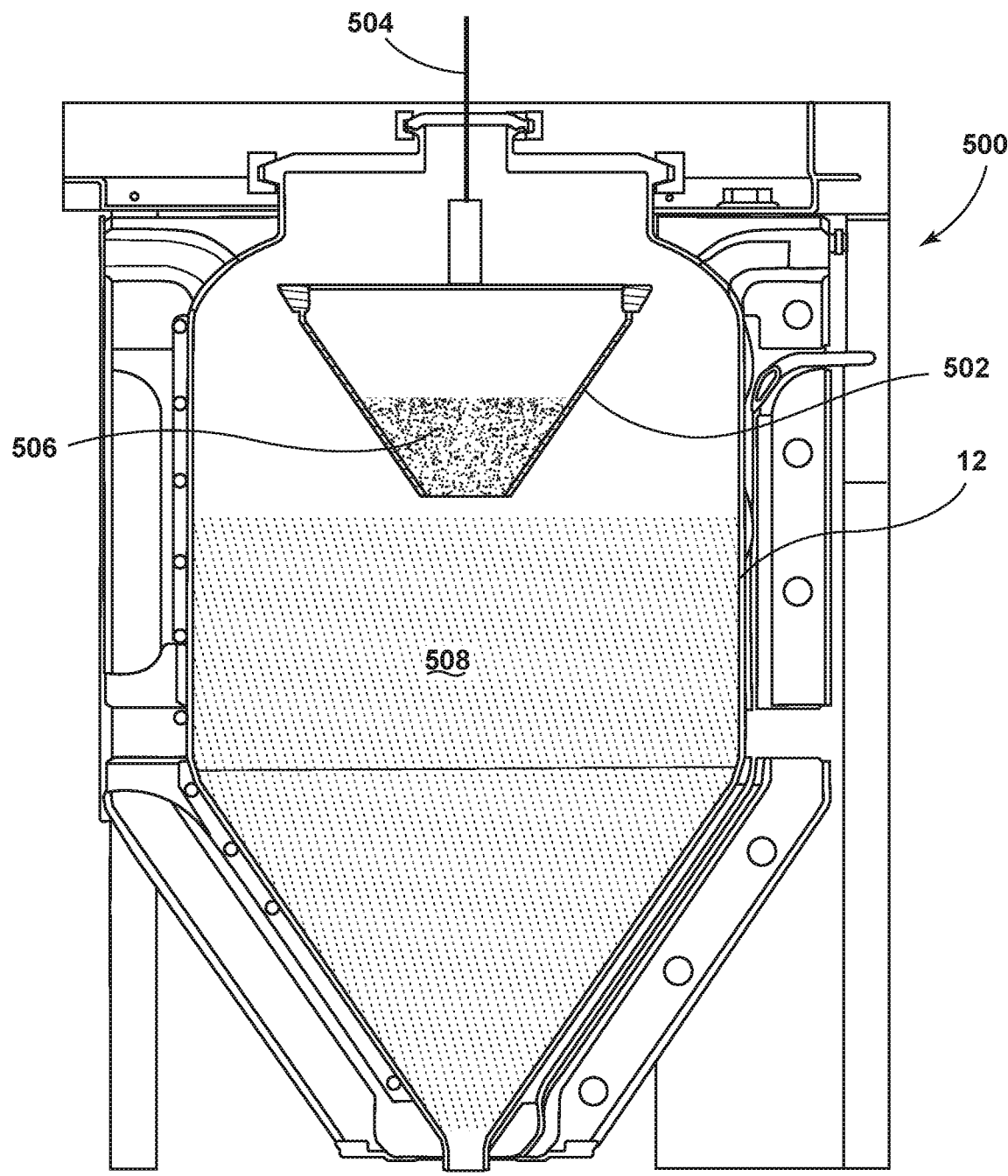
FIG. 28 is a front elevational cross-sectional view of the sediment removal assembly of FIG. 26 after drawing the filter basket upward through a beverage.
Figure 29:
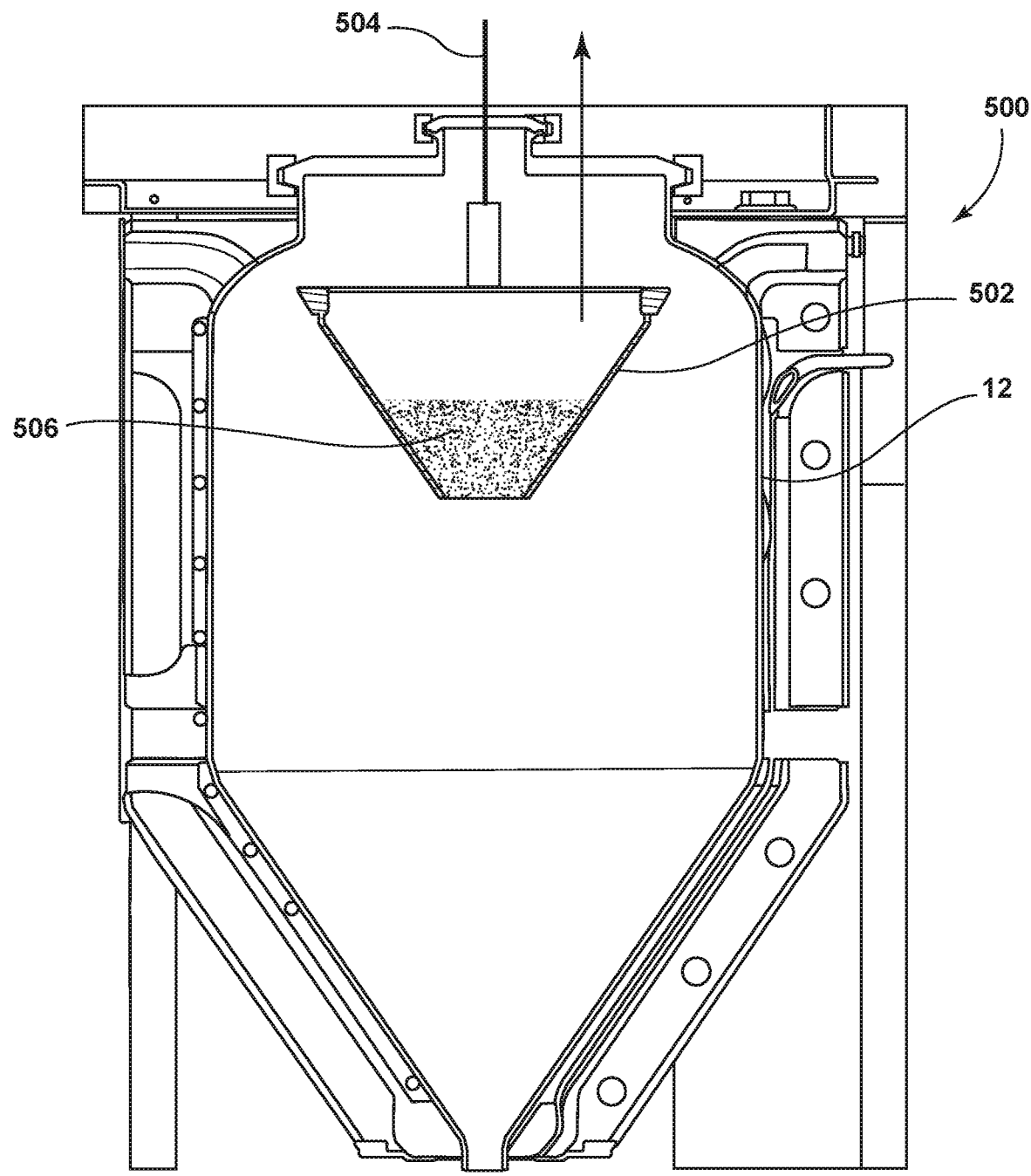
FIG. 29 a front elevational cross-sectional view of the sediment removal assembly of FIG. 26 after drawing the filter basket upward after the beverage has been removed.
Figure 30:
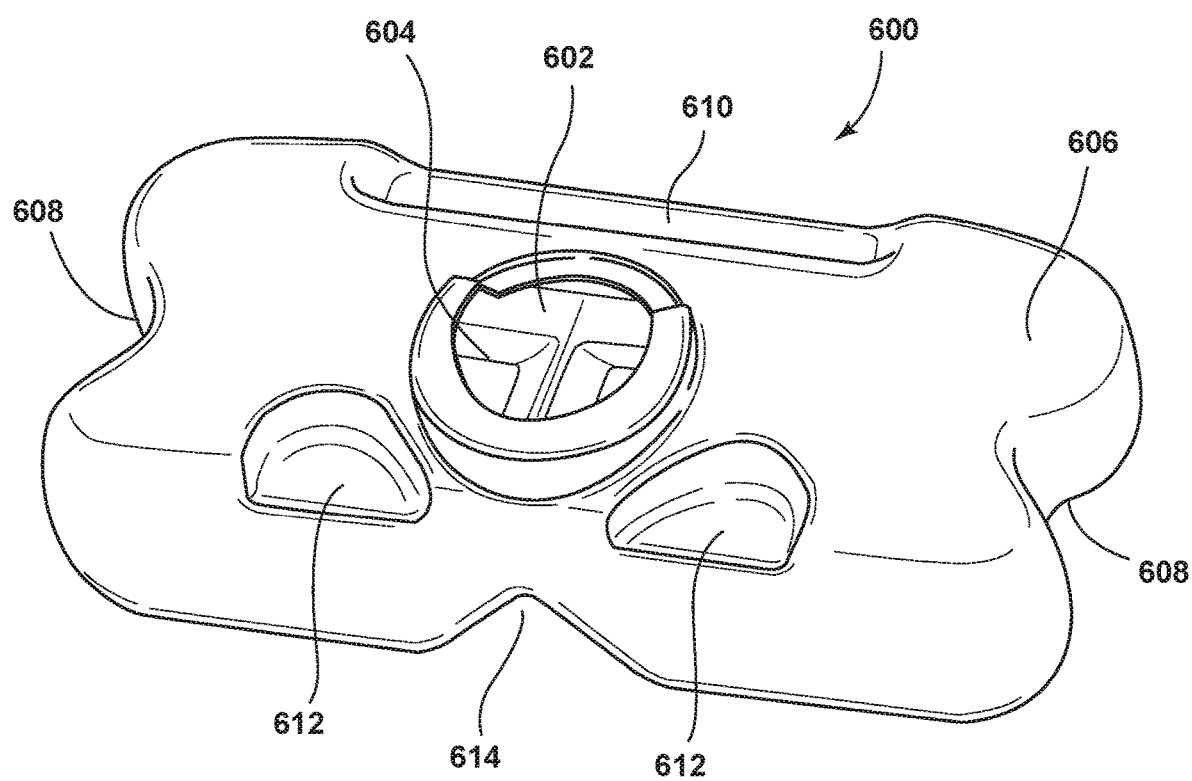
FIG. 30 is a front perspective view of one embodiment of a purge tank of the present disclosure.
Figure 31:
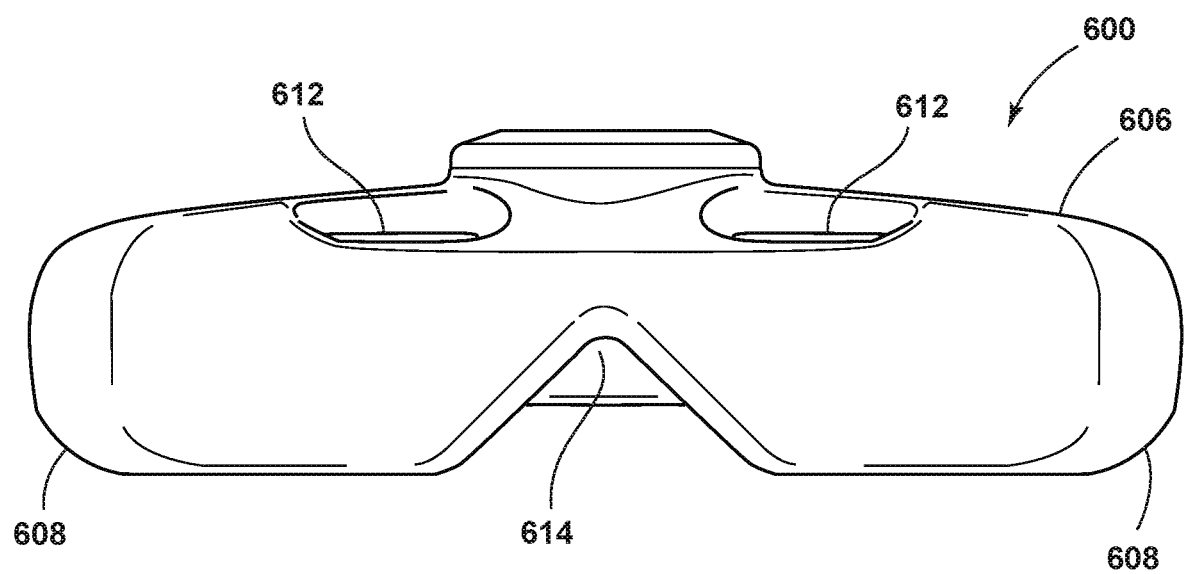
FIG. 31 is a front elevational view of the purge tank of FIG. 30.
Figure 32:
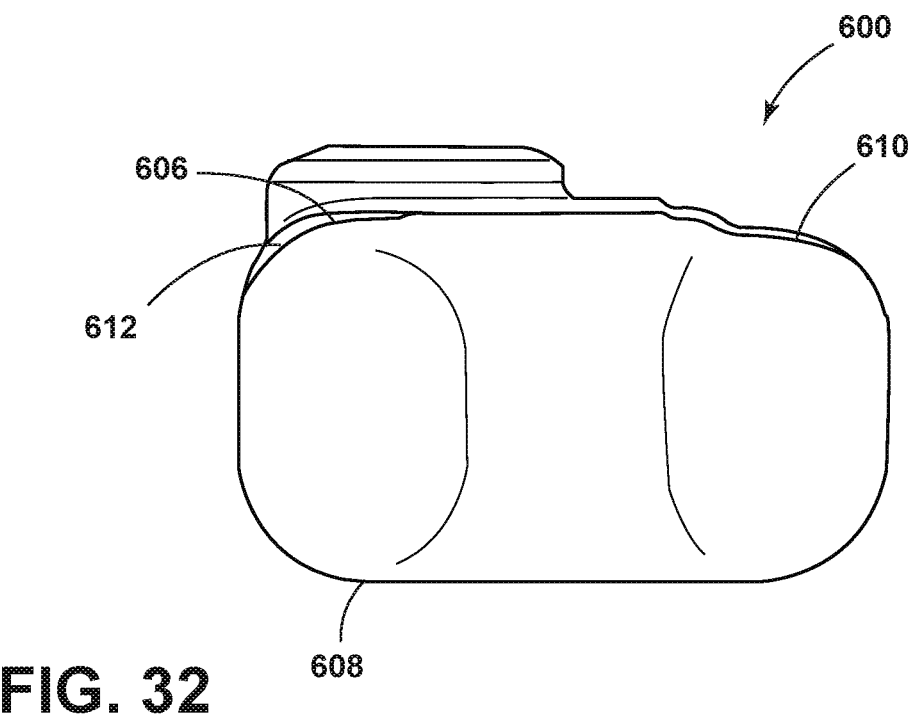
FIG. 32 is a side elevational view of the purge tank of FIG. 30.
Figure 33:
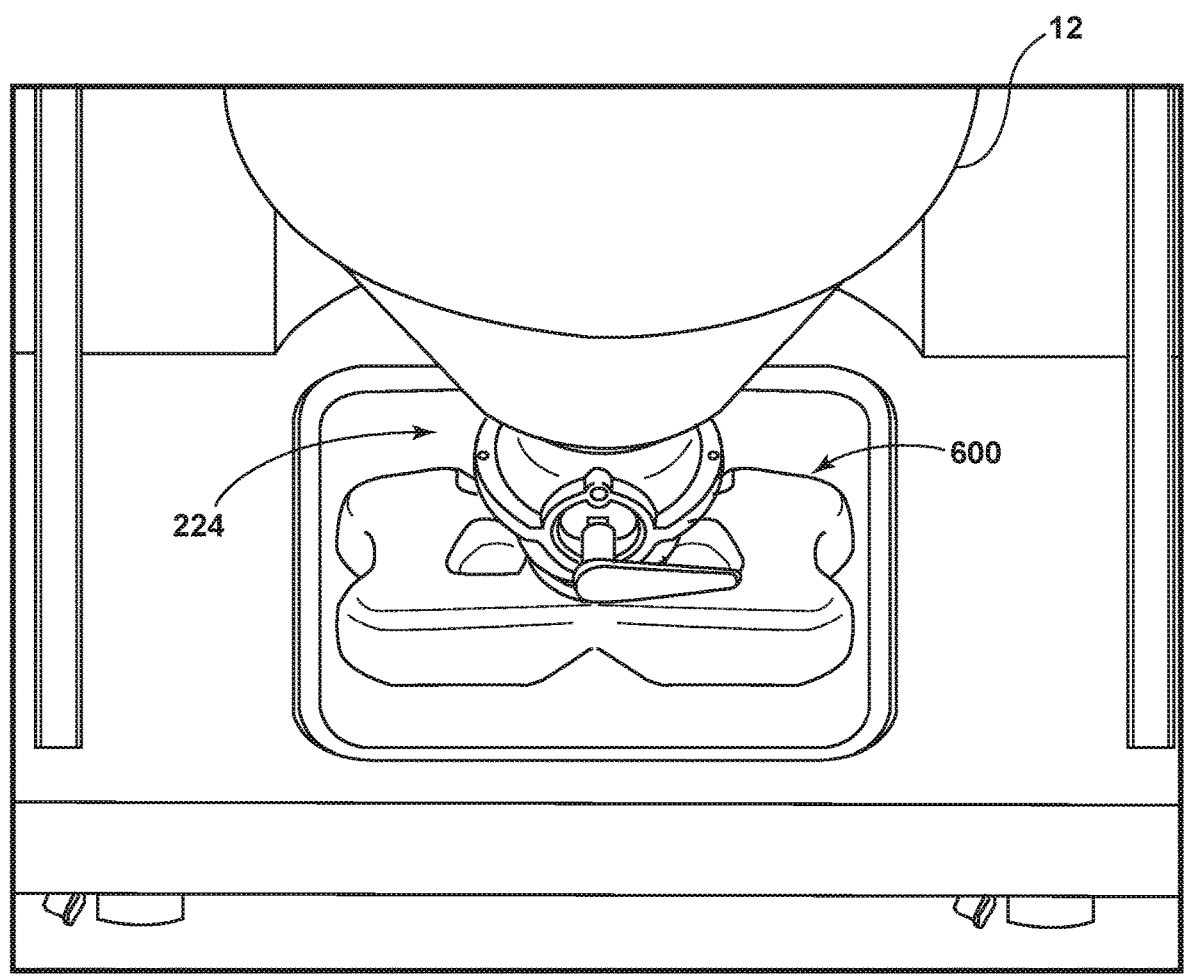
FIG. 33 is a top perspective view of the a purge tank of the present disclosure in use.
Figure 34:
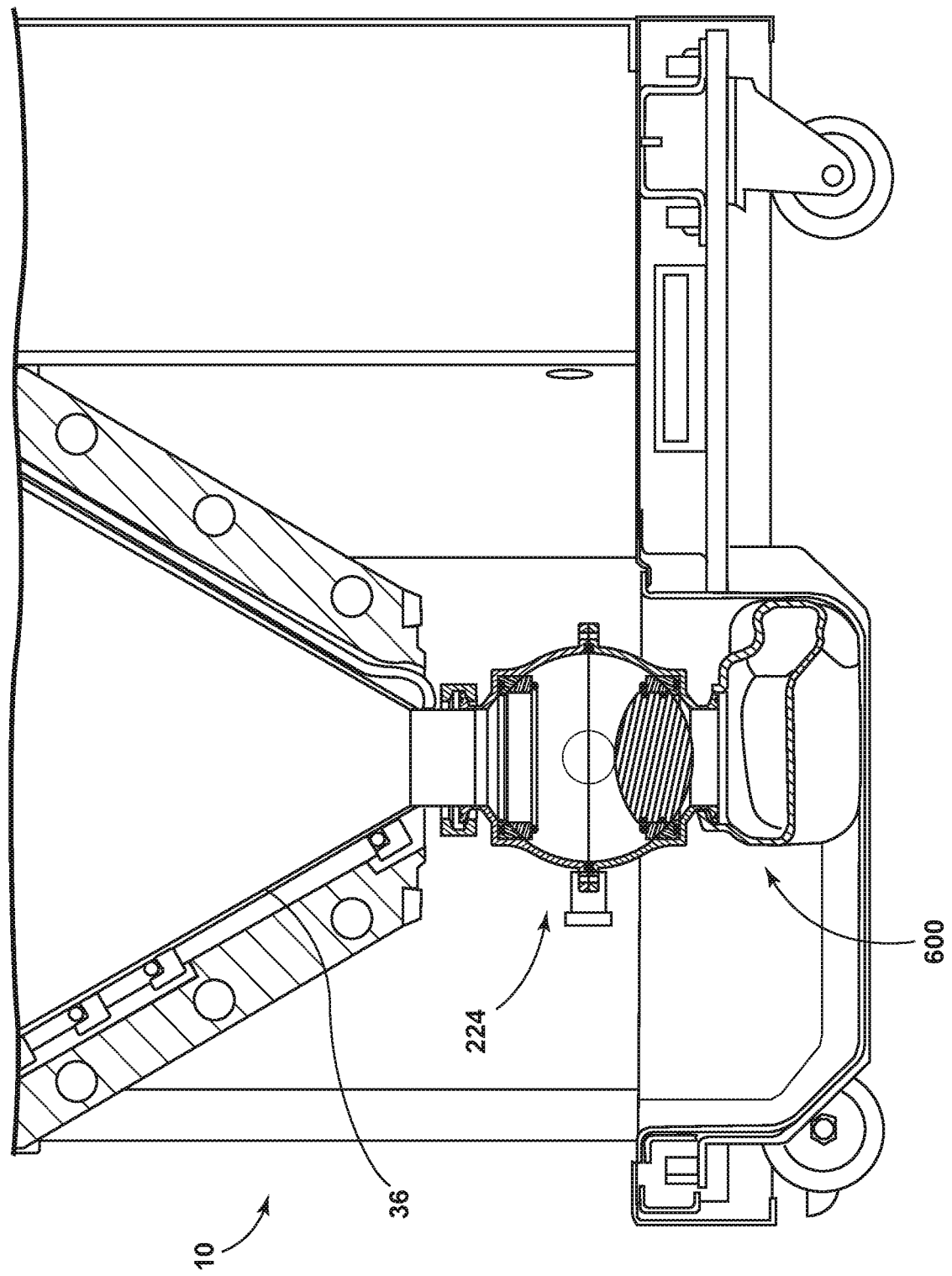
FIG. 34 is a side elevational partial cross sectional view of a sediment removal assembly and purge tank combination.

With reference now to FIGS. 26-29, a sediment removal assembly 500 is illustrated. The sediment removal assembly 500 includes a filter basket 502 installed at a bottom portion of the vessel 12 (FIG. 26). A line 504 is coupled with the filter basket 502 and is configured to raise the filter basket 502 upward. Over time, sediment 506 settles into the filter basket 502 as the fermentation process continues, as shown in FIG. 27. As illustrated in FIG. 28, after a predetermined period of time, the sediment 506 can be drawn upward within the filter basket 502. Any residual beverage 508 can drip through the filter basket 502 and back into the vessel 12. Once the beverage has been withdrawn from the vessel 12 (FIG. 29), or while the beverage is still within the vessel 12 (FIG. 28), the filter basket 502 and sediment 506 can be withdrawn from the vessel 12 and the sediment 506 can be disposed. The sediment removal assembly 500 does not require the system to be depressurized thus exposing beer to the atmosphere. Additionally, this configuration is cleaner and only requires user interaction to discard the sediment during the cleaning/sanitizing phase. Also, minimal beverage is lost using this system.

With reference now to FIGS. 30-34, a purge tank 600 is illustrated having an upper opening 602 configured for snap-fit engagement with the vessel 12. The purge tank 600 defines a reservoir 604 for collecting sludge and sediment from the vessel 12. The purge tank 600 includes a body 606 constructed from polyethylene terephthalate or high density polyethylene. The body 606 includes first and second side indents 608 that assist a user to grasp the purge tank 606 and can also serve as locating features to properly position the purge tank 600 below the vessel 12. In addition, the purge tank 600 includes a rear ledge which can serve to hold the purge tank 600 in place as well as forward depressions 612 that provide a grasping surface of the tank 600. A central recess 614 is also provided on a bottom of the purge tank 600. The central recess 614 moves sediment and sludge to each side of the tank 600 to minimize pooling in a central area of the tank 600. In addition, the control recess 614 deflects incoming spray to the sides of the tank to minimize splash back towards the opening 602 of the tank 600. The purge tank 600 is configured to minimize splash and provide a useful and durable collection tank that can easily be removed and cleaned. The connection of the purge tank with the vessel 12 can be fasteners, a snap-fit or interference fit connection, a screw-on assembly, etc.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its form, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A fermentation system comprising:
a vessel defining a chamber for holding liquids and including a neck extending to a lower aperture;
an insulating jacket disposed around the vessel and defining an opening, the neck of the vessel extending through the opening;
a cooling fluid disposed between and in contact with both the insulating jacket and the vessel, the cooling fluid being in fluid communication with a fluid pump;
a beverage line operably coupling the lower aperture with a dispensing spigot, the beverage line being wrapped around the vessel and at least partially submerged in the fluid; and
a collar coupled with the neck of the vessel, the collar including a gasket in abutting contact with the insulating jacket to maintain the cooling fluid within a space between the insulating jacket and the vessel.

2. The fermentation system of claim 1, wherein the cooling fluid includes a glycol solution.

3. The fermentation system of claim 1, wherein the vessel includes a conical bottom portion, the neck extending from the conical bottom portion.

4. The fermentation system of claim 1, wherein the insulating jacket includes expanded polystyrene.

5. The fermentation system of claim 1, further comprising:
a refrigerant line wrapped around the vessel and configured to cool the fluid and the vessel, resulting in cooling of liquids disposed in the chamber; and
a refrigerating unit in fluid communication with the cooling fluid and which cools and circulates the cooling fluid.

6. The fermentation system of claim 1, further comprising:
a sediment collection device disposed on the neck of the vessel; and
a sediment drain line disposed below the lower aperture and configured to drain sediment that accumulates on a bottom of the vessel.

7. A fermentation system comprising:
a vessel defining a chamber for holding liquids and including a lower aperture;
an insulating jacket disposed around the vessel;
a fluid disposed between and in contact with the insulating jacket and the vessel; and
a beverage line operably coupling the lower aperture with a dispensing spigot, the beverage line being wrapped around the vessel and at least partially submerged in the fluid, the dispensing spigot being selectively operably coupled with a tap for dispending liquid from the vessel and decoupled with the tap receiving hot wort for circulation through the beverage line for cooling the wort and injecting the wort into the chamber.

8. The fermentation system of claim 7, wherein the vessel includes an upper flange with a tap extending upwardly therefrom, the tap being operably coupled with the dispensing spigot.

9. The fermentation system of claim 7, wherein the vessel includes a conical bottom portion.

10. The fermentation system of claim 7, further comprising:
a refrigerant line wrapped around the vessel and configured to cool the fluid and the vessel, resulting in cooling of liquids disposed in the chamber; and
a refrigerating unit in fluid communication with the cooling fluid and which cools and circulates the cooling fluid.

11. The fermentation system of claim 7, further comprising:
a sediment collection device disposed on a bottom portion of the vessel.

12. A fermentation system comprising:
a vessel defining a chamber for holding liquids; and
a sediment removal assembly disposed on a bottom of the vessel and which includes a rotatable sediment reservoir having a stopper sealingly engaged with a wall of the sediment reservoir and slideable within the reservoir to expel excess sediment collected within the vessel when the reservoir is rotated.

13. The fermentation system of claim 12, wherein the vessel includes an upper flange with a tap extending upwardly therefrom, the tap being operably coupled with the dispensing spigot.

14. The fermentation system of claim 12, further comprising:
an insulating jacket disposed around the vessel;
a fluid disposed between and in contact with both the insulating jacket and the vessel;
a refrigerant line wrapped around the vessel and configured to cool the fluid and the vessel, resulting in cooling of liquids disposed in the chamber; and
a refrigerating unit in fluid communication with the fluid and which cools and circulates the fluid.

15. The fermentation system of claim 12, further comprising:
a sediment collection device disposed on a bottom portion of the vessel, the sediment removal assembly being in communication with the sediment collection device.

16. The fermentation system of claim 12, wherein the vessel further defines a lower aperture, the fermentation system further including:
a beverage line operably coupling the lower aperture with a dispensing spigot, the beverage line being wrapped around the vessel and at least partially submerged in the fluid, the dispensing spigot being selectively operably coupled with a tap for dispending liquid from the vessel or receiving hot wort for circulation through the beverage line, to cool the wort and introduce the wort into the chamber.

17. The fermentation system of claim 12, wherein the stopper is slideable within the reservoir under internal pressure from the vessel when the vessel is rotated.

18. The fermentation system of claim 12, wherein the reservoir is defined in a cylindrical body having a first axis about which the reservoir is rotatable, the reservoir being defined by a cylindrical opening formed through the cylindrical body and extending along a second axis normal to the first axis.

19. The fermentation system of claim 12, wherein the sediment removal assembly further includes a plunger coupled with the stopper to force sliding of the stopper within the reservoir by a force applied on an end of the plunger opposite the stopper and disposed outside of the reservoir.

20. The fermentation system of claim 12, further comprising a purge tank removably engageable with the vessel in communication with the reservoir.

* * * * *